United States Patent
Wu et al.

(10) Patent No.: US 10,623,310 B2
(45) Date of Patent: *Apr. 14, 2020

(54) NETWORK INTERFACE CARD, COMPUTING DEVICE, AND DATA PACKET PROCESSING METHOD

(71) Applicant: HUAWEI TECHNOLOGIES CO., LTD., Shenzhen OT (CN)

(72) Inventors: Tianyi Wu, Shenzhen (CN); Zhongjun Zhang, Shenzhen (CN); Tao Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,102

(22) Filed: Mar. 21, 2018

(65) Prior Publication Data
US 2018/0212869 A1 Jul. 26, 2018

Related U.S. Application Data

(63) Continuation of application No. PCT/CN2016/093095, filed on Aug. 3, 2016.

(51) Int. Cl.
*H04L 12/721* (2013.01)
*H04L 12/931* (2013.01)
(Continued)

(52) U.S. Cl.
CPC .......... *H04L 45/38* (2013.01); *G06F 9/45558* (2013.01); *H04L 45/64* (2013.01);
(Continued)

(58) Field of Classification Search
CPC ..... H04L 45/38; H04L 45/64; H04L 59/3009; H04L 49/70; H04L 49/90; H04L 69/22; G06F 9/45558; G06F 2009/45595
See application file for complete search history.

(56) References Cited

U.S. PATENT DOCUMENTS

2008/0031260 A1* 2/2008 Polland ............... H04L 12/4645
370/395.53
2010/0135182 A1 6/2010 Yoon et al.
(Continued)

FOREIGN PATENT DOCUMENTS

CN 102780608 A 11/2012
CN 103140830 A 6/2013
(Continued)

OTHER PUBLICATIONS

Anonymous: "Virtualization Techniques", on May 27, 2013, pp. 1-63, XP055512773.
(Continued)

*Primary Examiner* — Michael Thier
*Assistant Examiner* — Brian P Cox
(74) *Attorney, Agent, or Firm* — Kilpatrick Townsend & Stockton LLP

(57) ABSTRACT

The present disclosure discloses a data packet processing method applied to a computing device in software-defined networking. After receiving a data packet of a data flow, a NIC queries a flow table set according to matching information of the data packet; and if a flow table is obtained from the flow table set the NIC processes the data packet according to the flow table; or if no flow table can be obtained from the flow table set, the NIC sends the data packet to a virtual switch to obtain a flow table corresponding to the data flow, and saves the flow table into the flow table set, so that the NIC can process a subsequent data packet of the data flow. An operating load of the virtual switch is reduced, and operating efficiency of the computing device is improved.

21 Claims, 11 Drawing Sheets

(51) Int. Cl.
  *H04L 12/861* (2013.01)
  *H04L 29/06* (2006.01)
  *G06F 9/455* (2018.01)
  *H04L 12/715* (2013.01)
  *H04L 12/935* (2013.01)

(52) U.S. Cl.
  CPC .............. *H04L 49/70* (2013.01); *H04L 69/22* (2013.01); *G06F 2009/45595* (2013.01); *H04L 49/3009* (2013.01); *H04L 49/90* (2013.01)

(56) References Cited

U.S. PATENT DOCUMENTS

| | | |
|---|---|---|
| 2012/0084487 A1 | 4/2012 | Barde |
| 2013/0010799 A1 | 1/2013 | Biwas et al. |
| 2013/0151685 A1 | 6/2013 | Bursell |
| 2013/0254766 A1* | 9/2013 | Zuo ................. H04L 47/20 718/1 |
| 2013/0266007 A1 | 10/2013 | Kumbhare et al. |
| 2014/0108632 A1 | 4/2014 | Narasimha et al. |
| 2014/0328350 A1 | 11/2014 | Hao et al. |
| 2015/0026681 A1 | 1/2015 | Lin et al. |
| 2015/0043576 A1 | 2/2015 | Dixon et al. |
| 2015/0135254 A1 | 5/2015 | Thilenius et al. |
| 2015/0139238 A1 | 5/2015 | Pourzandi et al. |
| 2015/0180959 A1 | 6/2015 | Bloch et al. |
| 2015/0205624 A1 | 7/2015 | Zhang et al. |
| 2015/0281067 A1 | 10/2015 | Wu |
| 2015/0347175 A1 | 12/2015 | Decusatis et al. |
| 2015/0365325 A1 | 12/2015 | Hwang et al. |
| 2015/0381494 A1* | 12/2015 | Cherian ................ H04L 45/745 370/392 |
| 2016/0142301 A1 | 5/2016 | Anand et al. |
| 2016/0197824 A1* | 7/2016 | Lin ..................... H04L 12/6418 370/389 |
| 2016/0203030 A1* | 7/2016 | Tateishi ................ G06F 9/5083 718/105 |
| 2016/0212772 A1 | 7/2016 | Chen et al. |
| 2016/0373337 A1 | 12/2016 | Decusatis et al. |
| 2017/0031704 A1 | 2/2017 | Sudhakaran et al. |
| 2017/0118173 A1* | 4/2017 | Arramreddy ....... H04L 63/0236 |
| 2017/0212864 A1 | 7/2017 | Leitner et al. |
| 2018/0212869 A1 | 7/2018 | Wu et al. |
| 2018/0219770 A1 | 8/2018 | Wu et al. |

FOREIGN PATENT DOCUMENTS

| | | |
|---|---|---|
| CN | 103346981 A | 10/2013 |
| CN | 203490899 U | 3/2014 |
| CN | 103856573 A | 6/2014 |
| CN | 103873374 A | 6/2014 |
| CN | 103916314 A | 7/2014 |
| CN | 104067231 A | 9/2014 |
| CN | 104205080 A | 12/2014 |
| CN | 104660574 A | 5/2015 |
| CN | 104717156 A | 6/2015 |
| CN | 104731521 A | 6/2015 |
| CN | 105718301 A | 6/2016 |
| CN | 106155551 A | 11/2016 |
| WO | 2015173759 A1 | 11/2015 |

OTHER PUBLICATIONS

ConnectX®-4 Lx EN, Ethernet Adapter Cards, Product Brief, © 2015 Mellanox Technologies, 3 pages.

ConnectX®-4 Ethernet Single and Dual Port QSFP28 Adapter Card User Manual, Rev 1.8, Mellanox Technologies, MLNX-15-5612, 2016, 80 pages.

* cited by examiner

CONT.
FROM
FIG. 4A

416 — After receiving the first data packet, the virtual switch obtains a flow table corresponding to the data flow, saves the flow table corresponding to the data flow in a flow table set accessible to a virtual switch, and adds the flow table corresponding to the data flow to the NIC-accessible flow table set

4181 — The NIC queries the NIC-accessible flow table set according to the matching information of the first data packet, to obtain the flow table corresponding to the data flow, and forwards the first data packet to an external network according to data packet routing information of the data flow

4182 — The virtual switch performs matching between the first data packet and the flow table corresponding to the data flow in the virtual-switch-accessible flow table set, to obtain data packet routing information of the data flow

4183 — The virtual switch generates a returned first data packet according to the data packet routing information of the data flow, and sends the returned first data packet to the NIC

4184 — The NIC forwards a second data packet to an external network according to a port identifier of the returned first data packet

4185 — The virtual switch sends the first data packet to a queue corresponding to the external network

4186 — The NIC receives the first data packet from the queue corresponding to an external network, and forwards the first data packet to the external network

FIG. 4B

NETWORK INTERFACE CARD, COMPUTING DEVICE, AND DATA PACKET PROCESSING METHOD

CROSS-REFERENCE TO RELATED APPLICATIONS

The present disclosure is a continuation of International Application No. PCT/CN2016/093095, filed on Aug. 3, 2016, the disclosure of which is hereby incorporated by reference in its entirety.

TECHNICAL FIELD

The present disclosure relates to the field of computer technologies, and in particular, to a network interface card (NIC for short), a computing device for processing a data packet, and a data packet processing method separately executed by the NIC and the computing device.

BACKGROUND

In a cloud computing environment, a service needs to be provided for a relatively large quantity of users. Therefore, there is usually a relatively large quantity of computing devices in a data center for providing a cloud service. In addition, multiple virtual machines (VM for short), for example, a VM-1 to a VM-n in FIG. 1, run on each computing device. A VM communicates, by using a virtual switch (VS for short), with a VM running on another computing device or a VM on a same computing device. A software-defined networking (SDN for short) controller centrally controls virtual switches on all computing devices. Currently, a common virtual switch includes an open vSwitch. The SDN controller generally controls all virtual switches by using a flow table defined in the OpenFlow protocol.

Hardware resources on each computing device need to support running of at least multiple VMs, a virtual switch, and a virtual machine monitor. The virtual machine monitor is also referred to as a virtual machine manager or a hypervisor. Each computing device has limited hardware resources. If a virtual switch responsible for a data exchanging task occupies excessive hardware resources, running of a VM on the computing device is easily affected, and operating efficiency is reduced.

SUMMARY

The present disclosure provides a data packet processing method, to improve data packet processing efficiency.

According to a first aspect of the present disclosure, a data packet processing method is provided, where the method is applied to a computing device, the computing device includes a network interface card NIC and a host, the NIC establishes a communications connection to the host, the NIC establishes a communications connection to an external network, a virtual machine VM runs on the host, and the method includes: receiving, by the NIC, a first data packet of a data flow sent by a source VM; querying, by the NIC, a flow table set according to matching information of the first data packet; and when a flow table corresponding to the data flow cannot be obtained by means of matching, forwarding, by the NIC, the first data packet to a virtual switch running on the host, where after receiving the first data packet, the virtual switch obtains the flow table corresponding to the data flow from an SDN controller, so that the flow table corresponding to the data flow is added to the flow table set.

After the virtual switch obtains the flow table corresponding to the data flow by using the first data packet, the virtual switch or a monitoring module running on the host saves the flow table corresponding to the data flow into the flow table set.

During actual running, after receiving a data packet, the NIC queries a flow table set according to matching information of the data packet. If a flow table corresponding to a data flow in which the data packet is located cannot be obtained, it indicates that the data packet is the $1^{st}$ data packet of the data flow in which the data packet is located, or the data packet is not the $1^{st}$ data packet of the data flow in which the data packet is located, but a flow table corresponding to the data flow in the flow table set is aged.

In the data packet processing method, the NIC executes an action of performing matching between a flow table and a data packet, to improve data packet processing efficiency, and sends, to the virtual switch, a data packet that cannot match a flow table, to obtain a corresponding flow table used by the NIC to process a subsequent data packet of the data flow.

With reference to the first aspect, in a first implementation manner of the first aspect, a NIC external network port is configured on the NIC, the NIC external network port is configured to establish a communications connection to the external network, at least one virtual switch port is configured on the virtual switch running on the host, each virtual switch port corresponds to one VM running on the host, and before the receiving, by the NIC, the first data packet, the method further includes: receiving, by the NIC, configuration information of the virtual switch port; and configuring, by the NIC, at least one NIC port on the NIC according to the configuration information of the virtual switch port, where each NIC port connects, by using a single-root input/output virtualization SR-I/OV technology, to one VM running on the host.

Configuration of the virtual switch port and the NIC port may be completed before the data packet processing method provided in the first aspect, and a NIC driver running on the host may send the configuration information of the virtual switch port to the NIC.

With reference to the first implementation manner of the first aspect, in a second implementation manner of the first aspect, the flow table corresponding to the data flow includes data packet routing information of the data flow, and after the forwarding the first data packet to the virtual switch, the method further includes: querying, by the NIC, the flow table set according to the matching information of the first data packet, to obtain the flow table corresponding to the data flow, and forwarding the first data packet to the external network according to the data packet routing information of the data flow.

After the virtual switch or the monitoring module running on the host saves the flow table corresponding to the data flow into the flow table set, the NIC queries the flow table set according to the matching information of the first data packet, and in this case, the flow table corresponding to the data flow has been stored in the flow table set. After sending the first data packet to the virtual switch, the NIC may periodically perform matching between the first data packet and a flow table in the flow table set. Alternatively, after the flow table corresponding to the data flow is saved into the flow table set, a notification message is sent to the NIC, to instruct the NIC to perform matching between the first data packet and a flow table in the flow table set.

In this implementation manner, the virtual switch does not need to perform matching between the first data packet and a flow table, thereby reducing an operating load of the virtual switch.

With reference to the first implementation manner of the first aspect, in a third implementation manner of the first aspect, the flow table corresponding to the data flow includes data packet routing information of the data flow, a virtual switch external network port is configured on the virtual switch, and after the forwarding the first data packet to the virtual switch, the method further includes: receiving, by the NIC, a first data packet returned by the virtual switch, where the returned first data packet includes a port identifier corresponding to the external network, the port identifier is a virtual switch external network port identifier or a NIC external network port identifier, and the port identifier is added by the virtual switch according to the data packet routing information of the flow table corresponding to the data flow; and forwarding, by the NIC, the first data packet to the external network according to the port identifier.

In this implementation manner, the NIC does not need to perform matching for the first data packet, thereby improving the data packet processing efficiency.

With reference to the first implementation manner of the first aspect, in a fourth implementation manner of the first aspect, the virtual switch communicates with the NIC by using a queue, and the queue corresponds to the external network; and after the forwarding the first data packet to the virtual switch, the method further includes: receiving, by the NIC, the first data packet from the queue, and forwarding, by the NIC, the first data packet to the external network according to queue information of the queue.

In this implementation manner, the NIC does not need to perform matching for the first data packet, and compared with the foregoing third implementation manner, the NIC does not need to convert the port identifier, thereby further improving the data packet processing efficiency.

According to a second aspect of the present disclosure, a NIC is provided, and the NIC is configured to execute the data packet processing method provided in the first aspect of the present disclosure. The NIC includes a host interface, a network interface, and a processing chip. The network interface is configured to communicate with an external network, and the network interface establishes a communications connection to the processing chip. The host interface is configured to communicate with a host, the host interface establishes a communications connection to the processing chip, and a VM runs on the host. The host interface is configured to receive a first data packet of a data flow sent by a source VM. The processing chip is configured to query a flow table set according to matching information of the first data packet, and when a flow table corresponding to the data flow cannot be obtained by means of matching, forward the first data packet to a virtual switch running on the host. After receiving the first data packet, the virtual switch obtains the flow table corresponding to the data flow from an SDN controller, so that the flow table corresponding to the data flow is added to the flow table set.

The NIC can execute an action of performing matching between a flow table and a data packet, thereby improving data packet processing efficiency, and the NIC sends, to the virtual switch, a data packet that cannot match a flow table, to obtain a corresponding flow table used by the NIC to process a subsequent data packet of the data flow.

With reference to the second aspect, in a first implementation manner of the second aspect, a NIC external network port is configured on the NIC, the NIC external network port corresponds to the network interface, at least one virtual switch port is configured on the virtual switch running on the host, and each virtual switch port corresponds to one VM running on the host; and the processing chip is further configured to receive configuration information of the virtual switch port, and configure at least one NIC port on the NIC according to the configuration information of the virtual switch port. Each NIC port connects, by using an SR-I/OV technology, to one VM running on the host.

With reference to the first implementation manner of the second aspect, in a second implementation manner of the second aspect, the processing chip is further configured to query the flow table set according to the matching information of the first data packet, to obtain the flow table corresponding to the data flow, where the flow table corresponding to the data flow includes data packet routing information of the data flow, and forward the first data packet to the external network according to the data packet routing information of the data flow.

In this implementation manner, the virtual switch does not need to perform matching for the first data packet, thereby reducing an operating load of the virtual switch.

With reference to the first implementation manner of the second aspect, in a third implementation manner of the second aspect, a virtual switch external network port is configured on the virtual switch; the processing chip is further configured to receive a first data packet returned by the virtual switch, where the returned first data packet includes a port identifier corresponding to the external network, the port identifier is a virtual switch external network port identifier or a NIC external network port identifier, and the port identifier is added by the virtual switch according to data packet routing information of the flow table corresponding to the data flow; and the processing chip is further configured to forward the first data packet to the external network according to the port identifier.

In this implementation manner, the NIC does not need to perform matching between the first data packet and a flow table, thereby improving the data packet processing efficiency.

With reference to the first implementation manner of the second aspect, in a fourth implementation manner of the second aspect, the virtual switch communicates with the NIC by using a queue, and the queue corresponds to the external network; and the processing chip is further configured to receive the first data packet from the queue, and forward the first data packet to the external network according to queue information of the queue.

In this implementation manner, the NIC does not need to perform matching between the first data packet and a flow table, and compared with the foregoing third implementation manner, the NIC does not need to convert the port identifier, thereby further improving the data packet processing efficiency.

According to a third aspect of the present disclosure, a data packet processing method is provided, where the method is applied to a computing device, the computing device includes a network interface card NIC and a host, the NIC establishes a communications connection to the host, the NIC establishes a communications connection to an external network, a virtual machine VM runs on the host, and the method includes: receiving, by the NIC, a second data packet of a data flow sent by a source VM; querying, by the NIC, a flow table set according to matching information of the second data packet, to obtain a flow table corresponding to the data flow, where the flow table corresponding to the data flow includes data packet routing information of the data flow; and forwarding, by the NIC, the second data packet to the external network according to the data packet routing information of the data flow.

In the data packet processing method, the NIC executes an action of performing matching between a flow table and a data packet, thereby improving the data packet processing efficiency.

With reference to the third aspect, in a first implementation manner of the third aspect, the NIC connects, by using an SR-I/OV technology, to the VM running on the host; and the NIC receives the second data packet by using a connection to the source VM.

With reference to the first implementation manner of the third aspect, in a second implementation manner of the third aspect, a NIC external network port is configured on the NIC, the NIC external network port is configured to establish a communications connection to the external network, the data packet routing information of the data flow indicates the NIC external network port, at least one virtual switch port is configured on a virtual switch running on the host, and each virtual switch port corresponds to one VM running on the host, and before the receiving, by the NIC, the second data packet, the method further includes: receiving, by the NIC, configuration information of the virtual switch port; and configuring at least one NIC port on the NIC according to the configuration information of the virtual switch port, where each NIC port connects, by using the SR-I/OV technology, to one VM running on the host.

With reference to the second implementation manner of the third aspect, in a third implementation manner of the third aspect, before the receiving, by the NIC, a second data packet of a data flow sent by a source VM, the method further includes: receiving, by the NIC, a third data packet of the data flow; querying, by the NIC, the flow table set according to matching information of the third data packet; and when the flow table corresponding to the data flow cannot be obtained by means of matching, forwarding, by the NIC, the third data packet to the virtual switch running on the host, where after receiving the third data packet, the virtual switch obtains the flow table corresponding to the data flow from an SDN controller, so that the flow table corresponding to the data flow is added to the flow table set.

With reference to the third implementation manner of the third aspect, in a fourth implementation manner of the third aspect, after the forwarding the third data packet to the virtual switch, the method further includes: querying, by the NIC, the flow table set according to the matching information of the third data packet, to obtain the flow table corresponding to the data flow, and forwarding the third data packet to the external network according to the data packet routing information of the data flow.

With reference to the third implementation manner of the third aspect, in a fifth implementation manner of the third aspect, a virtual switch external network port is configured on the virtual switch, and after the forwarding the third data packet to the virtual switch, the method further includes: receiving, by the NIC, a third data packet returned by the virtual switch, where the returned third data packet includes a port identifier corresponding to the external network, the port identifier is a virtual switch external network port identifier or a NIC external network port identifier, and the port identifier is added by the virtual switch according to the data packet routing information of the data flow; and forwarding, by the NIC, the third data packet to the external network according to the port identifier.

With reference to the third implementation manner of the third aspect, in a sixth implementation manner of the third aspect, the virtual switch communicates with the NIC by using a queue, and the queue corresponds to the external network;

and after the forwarding the third data packet to the virtual switch, the method further includes: receiving, by the NIC, the third data packet from the queue, and forwarding, by the NIC, the third data packet to the external network according to queue information of the queue.

With reference to any one of the third aspect or the foregoing implementation manners of the third aspect, in a seventh implementation manner of the third aspect, before the forwarding, by the NIC, the second data packet to the external network, the method further includes: adding, by the NIC, an overlay header to the second data packet to generate an overlay data packet, where the overlay header includes a Virtual Extensible Local Area Network VXLAN header, a Network Virtualization using Generic Routing Encapsulation NVGRE header, or a Stateless Transport Tunneling STT header; and the sending, by the NIC, the second data packet to the external network includes: sending, by the NIC, the overlay data packet to the external network.

It should be noted that if an overlay technology is used for all data packets of the data flow, the NIC also needs to add an overlay header to the third data packet. In this implementation manner, it is provided as an example that the NIC encapsulates an overlay header for the second data packet, and actually, before sending a data packet of the data flow to the external network, the NIC also encapsulates an overlay header for the data packet.

In this implementation manner, the NIC implements encapsulation of the overlay header, thereby reducing an operating load of the host.

With reference to any one of the third aspect or the foregoing implementation manners of the third aspect, in an eighth implementation manner of the third aspect, before the querying, by the NIC, a flow table set according to matching information of the second data packet, the method further includes: performing, by the NIC, a security group check on the second data packet, and after the NIC determines that the second data packet passes the security group check, performing a step of querying the flow table set according to the matching information of the second data packet.

It should be noted that if a security group is configured for all the data packets of the data flow, the NIC does not query the flow table set according to the matching information of the third data packet until the NIC determines that the third data packet passes a security group check. In this implementation manner, it is provided as an example that the NIC performs the security group check on the second data packet. Actually, before performing matching for another data packet of the data flow, the NIC also needs to perform a security group check on the another data packet.

In this implementation manner, the NIC further implements the security group check on the second data packet, thereby improving data packet receiving and sending security and further reducing an operating load of the host.

According to a fourth aspect of the present disclosure, a NIC is provided, and the NIC is configured to execute the data packet processing method provided in the third aspect. The NIC includes a host interface, a network interface, and a processing chip. The network interface is configured to communicate with an external network, and the network interface establishes a communications connection to the processing chip. The host interface is configured to communicate with a host, the host interface establishes a communications connection to the processing chip, and a VM runs on the host. The host interface is configured to receive a second data packet of a data flow sent by a source VM. The processing chip is configured to query a flow table set according to matching information of the second data packet, to obtain a flow table corresponding to the data flow, where the flow table corresponding to the data flow includes data packet routing information of the data flow; and forward the second data packet to the external network according to the data packet routing information of the data flow.

With reference to the fourth aspect, in a first implementation manner of the fourth aspect, the NIC connects, by using an SR-I/OV technology, to the VM running on the host; and the host interface is configured to receive the second data packet by using a connection to the source VM.

With reference to the first implementation manner of the fourth aspect, in a second implementation manner of the fourth aspect, a NIC external network port is configured on the NIC, the NIC external network port corresponds to the network interface, at least one virtual switch port is configured on a virtual switch running on the host, and each virtual switch port corresponds to one VM running on the host; and the processing chip is further configured to receive configuration information of the virtual switch port, and configure at least one NIC port on the NIC according to the configuration information of the virtual switch port. Each NIC port connects, by using the SR-I/OV technology, to one VM running on the host.

With reference to the second implementation manner of the fourth aspect, in a third implementation manner of the fourth aspect, the network interface is further configured to receive a third data packet of the data flow; and the processing chip is further configured to query the flow table set according to matching information of the third data packet, and when the flow table corresponding to the data flow cannot be obtained by means of matching, forward the third data packet to the virtual switch running on the host. After receiving the third data packet, the virtual switch obtains the flow table corresponding to the data flow from an SDN controller, so that the flow table corresponding to the data flow is added to the flow table set.

With reference to the third implementation manner of the fourth aspect, in a fourth implementation manner of the fourth aspect, the processing chip is further configured to query the flow table set according to the matching information of the third data packet, to obtain the flow table corresponding to the data flow, and forward the third data packet to the external network according to the data packet routing information of the data flow.

With reference to the third implementation manner of the fourth aspect, in a fifth implementation manner of the fourth aspect, the processing chip is further configured to receive a third data packet returned by the virtual switch, where a virtual switch external network port is configured on the virtual switch, the returned third data packet includes a port identifier corresponding to the external network, the port identifier is a virtual switch external network port identifier or a NIC external network port identifier, and the port identifier is added by the virtual switch according to the data packet routing information of the data flow; and forward the third data packet to the external network according to the port identifier.

With reference to the third implementation manner of the fourth aspect, in a sixth implementation manner of the fourth aspect, the virtual switch communicates with the NIC by using a queue, and the queue corresponds to the external network; and the processing chip is further configured to receive the third data packet from the queue, and forward the third data packet to the external network according to queue information of the queue.

With reference to any one of the fourth aspect or the foregoing implementation manners of the fourth aspect, in a seventh implementation manner of the fourth aspect, the processing chip is further configured to add an overlay header to the second data packet to generate an overlay data packet, where the overlay header includes a Virtual Extensible Local Area Network VXLAN header, a Network Virtualization using Generic Routing Encapsulation NVGRE header, or a Stateless Transport Tunneling STT header; and the processing chip is further configured to send the overlay data packet to the external network by using the network interface.

With reference to any one of the fourth aspect or the foregoing implementation manners of the fourth aspect, in an eighth implementation manner of the fourth aspect, before querying the flow table set according to the matching information of the second data packet, the processing chip is further configured to perform a security group check on the second data packet, and after the processing chip determines that the second data packet passes the security group check, perform a step of querying the flow table set according to the matching information of the second data packet.

According to a fifth aspect of the present disclosure, a computing device is provided. The computing device includes a network interface card NIC and a host, the NIC establishes a communications connection to the host, a virtual machine VM and a virtual switch run on the host, a NIC external network port is configured on the NIC, and the NIC external network port is configured to establish a communications connection to an external network. The host is configured to send configuration information to the NIC; the NIC is adapted to configure at least one NIC port on the NIC according to the configuration information. Each NIC port connects, by using an SR-I/OV technology, to one VM running on the host; the NIC is further configured to receive a second data packet of a data flow sent by a source VM, and query a flow table set according to matching information of the second data packet, to obtain a flow table corresponding to the data flow, where the flow table corresponding to the data flow includes data packet routing information of the data flow; and the NIC is further configured to forward the second data packet to the external network according to the data packet routing information of the data flow.

With reference to the fifth aspect, in a first implementation manner of the fifth aspect, the NIC is further configured to receive a third data packet of the data flow, query the flow table set according to matching information of the third data packet, and when the flow table corresponding to the data flow cannot be obtained by means of matching, forward the third data packet to the host; and the host is configured to: after receiving the third data packet, obtain the flow table corresponding to the data flow from an SDN controller, so that the flow table corresponding to the data flow is added to the flow table set.

Specifically, the NIC sends the third data packet to the virtual switch running on the host.

The host is configured to: after receiving the third data packet, obtain the flow table corresponding to the data flow from an SDN controller, so that the flow table corresponding to the data flow is added to the flow table set.

With reference to the first implementation manner of the fifth aspect, in a second implementation manner of the fifth aspect, the NIC is further configured to query the flow table set according to the matching information of the third data packet, to obtain the flow table corresponding to the data flow, and forward the third data packet to the external network according to the data packet routing information of the data flow.

After the flow table corresponding to the data flow is added to the flow table set, the NIC queries the flow table set according to the matching information of the third data packet.

With reference to the first implementation manner of the fifth aspect, in a third implementation manner of the fifth aspect, a virtual switch external network port is configured on the virtual switch; the host is further configured to generate a returned third data packet, where the returned third data packet includes a port identifier corresponding to the external network, the port identifier is a virtual switch external network port identifier or a NIC external network port identifier, and the port identifier is added by the host according to the data packet routing information of the data flow; and the NIC is further configured to receive the returned third data packet, and forward the third data packet to the external network according to the port identifier.

After receiving the third data packet sent by the NIC, the host generates the returned third data packet.

With reference to the first implementation manner of the fifth aspect, in a fourth implementation manner of the fifth aspect, the virtual switch communicates with the NIC by using a queue, and the queue corresponds to the external network; the host is further configured to send the third data packet to the queue; and the NIC is further configured to receive the third data packet from the queue, and forward the third data packet to the external network according to queue information of the queue.

With reference to any one of the fifth aspect or the foregoing implementation manners of the fifth aspect, in a fifth implementation manner of the fifth aspect, the NIC is further configured to add an overlay header to the second data packet to generate an overlay data packet, where the overlay header includes a Virtual Extensible Local Area Network VXLAN header, a Network Virtualization using Generic Routing Encapsulation NVGRE header, or a Stateless Transport Tunneling STT header; and the NIC is further configured to send the overlay data packet to the external network.

With reference to any one of the fifth aspect or the foregoing implementation manners of the fifth aspect, in a sixth implementation manner of the fifth aspect, before querying the flow table set according to the matching information of the second data packet, the NIC is further configured to perform a security group check on the second data packet, and after the NIC determines that the second data packet passes the security group check, perform a step of querying the flow table set according to the matching information of the second data packet.

According to a sixth aspect of the present disclosure, a data packet processing method is provided, and the method is applied to the computing device provided in the fifth aspect. The method includes: sending, by a host, configuration information to a NIC; configuring, by the NIC, at least one NIC port on the NIC according to the configuration information, where each NIC port connects, by using an SR-I/OV technology, to one VM running on the host; receiving, by the NIC, a second data packet of a data flow sent by a source VM, and querying a flow table set according to matching information of the second data packet, to obtain a flow table corresponding to the data flow, where the flow table corresponding to the data flow includes data packet routing information of the data flow; and forwarding, by the NIC, the second data packet to an external network according to the data packet routing information of the data flow.

With reference to the sixth aspect, in a first implementation manner of the sixth aspect, the method further includes: receiving, by the NIC, a third data packet of the data flow, querying the flow table set according to matching information of the third data packet, and when the flow table corresponding to the data flow cannot be obtained by means of matching, forwarding the third data packet to the host; and after receiving the third data packet, obtaining, by the host, the flow table corresponding to the data flow from an SDN controller, so that the flow table corresponding to the data flow is added to the flow table set.

With reference to the first implementation manner of the sixth aspect, in a second implementation manner of the sixth aspect, after the forwarding, by the NIC, the third data packet to the host, the method further includes: querying, by the NIC, the flow table set according to the matching information of the third data packet, to obtain the flow table corresponding to the data flow, and forwarding the third data packet to the external network according to the data packet routing information of the data flow.

With reference to the first implementation manner of the sixth aspect, in a third implementation manner of the sixth aspect, a virtual switch external network port is configured on a virtual switch; and after the forwarding, by the NIC, the third data packet to the host, the method further includes: generating, by the host, a returned third data packet, where the returned third data packet includes a port identifier corresponding to the external network, the port identifier is a virtual switch external network port identifier or a NIC external network port identifier, and the port identifier is added by the host according to the data packet routing information of the data flow; and receiving, by the NIC, the returned third data packet, and forwarding the third data packet to the external network according to the port identifier.

With reference to the first implementation manner of the sixth aspect, in a fourth implementation manner of the sixth aspect, the virtual switch communicates with the NIC by using a queue, and the queue corresponds to the external network; and after the forwarding, by the NIC, the third data packet to the host, the method further includes: sending, by the host, the third data packet to the queue; and receiving, by the NIC, the third data packet from the queue, and forwarding the third data packet to the external network according to queue information of the queue.

With reference to any one of the sixth aspect or the foregoing implementation manners of the sixth aspect, in a fifth implementation manner of the sixth aspect, the forwarding, by the NIC, the second data packet to the external network specifically includes: adding, by the NIC, an overlay header to the second data packet to generate an overlay data packet, where the overlay header includes a Virtual Extensible Local Area Network VXLAN header, a Network Virtualization using Generic Routing Encapsulation NVGRE header, or a Stateless Transport Tunneling STT header; and sending, by the NIC, the overlay data packet to the external network.

With reference to any one of the sixth aspect or the foregoing implementation manners of the sixth aspect, in a sixth implementation manner of the sixth aspect, before querying the flow table set according to the matching information of the second data packet, the NIC further performs a security group check on the second data packet, and after the NIC determines that the second data packet passes the security group check, the NIC performs a step of querying the flow table set according to the matching information of the second data packet.

According to a seventh aspect of the present disclosure, a configuration method is provided. The configuration method is applied to a host, the host establishes a communications connection to a NIC, and a VM, a virtual switch, and a NIC driver run on the host. At least one virtual switch port is configured on the virtual switch running on the host, and each virtual switch port corresponds to one VM running on the host. The method includes: sending, by the NIC driver, a configuration information to the NIC, where the configuration information indicates that at least one NIC port is configured on the NIC, and each NIC port connects, by using an SR-I/OV technology, to one VM running on the host.

A NIC external network port is further configured on the NIC, and the NIC external network port is used by the NIC to connect to an external network. In some embodiments, configuration of the NIC external network port may be implemented by using the configuration information, or configuration of the NIC external network port is implemented before the NIC receives the configuration information.

According to an eighth aspect of the present disclosure, a data packet processing method is provided, and the method is applied to a host that executes the configuration method provided in the seventh aspect of the present disclosure. When running, the host executes a host side part in the data packet processing method provided in the fifth aspect of the present disclosure. The method includes: receiving, by a virtual switch running on the host, a third data packet; obtaining, by the virtual switch, a flow table corresponding to the data flow from an SDN controller; and adding, by the virtual switch or a monitoring module running on the host, the flow table corresponding to the data flow to a flow table set, so that a NIC processes a subsequent data packet of the data flow according to the flow table that is in the flow table set and that corresponds to the data flow.

With reference to the eighth aspect, in a first implementation manner of the eighth aspect, after the adding the flow table corresponding to the data flow to a flow table set, the method further includes: sending, by the virtual switch, a notification message to the NIC, where the notification message is used to notify the NIC that the flow table corresponding to the data flow has been added to the flow table set, so that the NIC processes the third data packet according to the flow table that is in the flow table set and that corresponds to the data flow.

With reference to the eighth aspect, in a second implementation manner of the eighth aspect, the flow table corresponding to the data flow includes data packet routing information of the data flow, and the method further includes: generating, by the virtual switch, a returned third data packet according to the data packet routing information of the data flow, where the returned third data packet includes a port identifier corresponding to the external network, and the port identifier is a virtual switch external network port identifier or a NIC external network port identifier, so that the NIC forwards the third data packet to the external network according to the port identifier.

With reference to the eighth aspect, in a third implementation manner of the eighth aspect, the virtual switch communicates with the NIC by using a queue, the queue corresponds to an external network, and the method further includes: sending, by the virtual switch, the third data packet to the queue; and sending, by a NIC driver, queue information of the queue to the NIC, so that the NIC forwards, according to the queue information of the queue, the third data packet to the external network from a NIC external network port.

According to a ninth aspect of the present disclosure, a host is provided. The host includes a processor, a memory, and a bus. The processor and the memory establish a communications connection by using the bus. When running, the processor executes the configuration method provided in the seventh aspect.

According to a tenth aspect of the present disclosure, a host is provided. The host includes a processor, a memory, and a bus. The processor and the memory establish a communications connection by using the bus. When running, the processor executes the data packet processing method provided in any one of the eighth aspect or the implementation manners of the eighth aspect.

According to an eleventh aspect of the present disclosure, a storage medium is provided. The storage medium stores program code, and when the program code is run by a computing device, the configuration method provided in the seventh aspect is executed. The storage medium includes but is not limited to a Flash memory, a hard disk (HDD for short), or a solid state drive (SSD for short).

According to a twelfth aspect of the present disclosure, a storage medium is provided. The storage medium stores program code, and when the program code is run by a computing device, the data packet processing method provided in any one of the eighth aspect or the implementation manners of the eighth aspect is executed. The storage medium includes but is not limited to a Flash memory, an HDD, or an SSD.

According to a thirteenth aspect of the present disclosure, a computer program product is provided, and the computer program product may be a software installation package. When the software installation package is run by a computing device, the configuration method provided in the seventh aspect is executed.

According to a fourteenth aspect of the present disclosure, a computer program product is provided, and the computer program product may be a software installation package. When the software installation package is run by a computing device, the data packet processing method provided in any one of the eighth aspect or the implementation manners of the eighth aspect is executed.

BRIEF DESCRIPTION OF DRAWINGS

To describe the technical solutions in the embodiments described herein more clearly, the following briefly introduces the accompanying drawings required for describing the embodiments.

FIG. 4A and FIG. 4B are a schematic flowchart of a data packet processing method according to an embodiment of the present disclosure;

DESCRIPTION OF EMBODIMENTS

Figure 1:
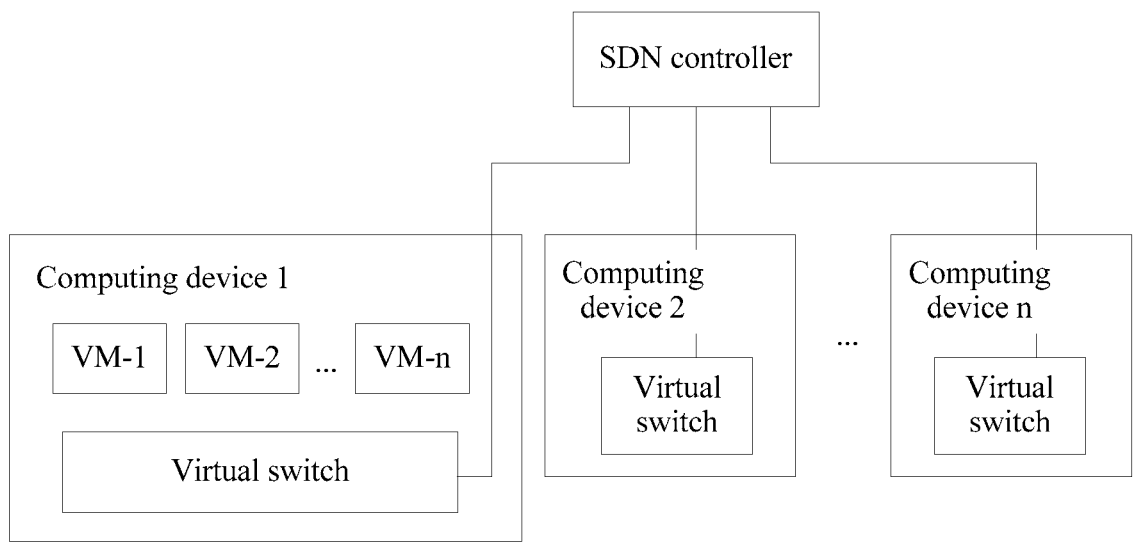
FIG. 1 is a schematic diagram of a data center architecture in the prior art.

The following describes the technical solutions in the embodiments described herein with reference to the accompanying drawings in the embodiments described herein.

In the present disclosure, terms such as first and second are used to distinguish between objects, for example, a first data packet and a second data packet. However, there is no logical or time-sequential dependency between all "first" and "second".

In the present disclosure, a data packet includes matching information and a payload. The matching information is used to match a match field of a flow table.

In the present disclosure, a flow table is used to control a data flow in SDN, and may also be referred to as an SDN flow table. Specifically, a flow table in accordance with an OpenFlow protocol or a flow table in accordance with another protocol may be used. The flow table includes at least a match field and an execution field. The match field is used to match a data packet, and the execution field is used to indicate an action that is to be executed for a data packet that matches the flow table. The execution field includes a data packet action identifier, such as forwarding, discarding, and sending to an SDN controller. The execution field further includes data packet routing information, such as a destination port identifier of a data packet.

In the present disclosure, a data flow indicates a series of data packets that can match a same flow table. Specifically, all matching information of data packets in a same data flow can match a match field of a flow table corresponding to the data flow.

In the present disclosure, a virtual switch is a switching device that is installed on a computing device and that is implemented by using software, and is generally used in SDN. A common virtual switch includes an open vSwitch, OVS for short. The OVS is a virtual switch provided by an open source project.

In the present disclosure, an overlay-type data packet refers to a data packet processed by using an overlay encapsulation technology. Specifically, the overlay encapsulation technology includes a Virtual Extensible Local Area Network (VXLAN for short) technology, a Network Virtualization using Generic Routing Encapsulation (NVGRE for short) technology, and a Stateless Transport Tunneling (STT for short) technology. The overlay-type data packet includes two parts: an overlay header and an original data packet. The original data packet refers to a data packet sent by a VM or a data packet sent to a VM through a virtual switch port. The original data packet is overlaid with the overlay header, so that the overlay-type data packet is transmitted in an overlay network. Different overlay encapsulation technologies are corresponding to different overlay headers.

In the present disclosure, a flow table set includes one or more flow tables. Two flow table sets are included in the present disclosure, that is, a virtual-switch-accessible flow table set and a NIC-accessible flow table set. A flow table in the virtual-switch-accessible flow table set is used by the virtual switch, and a flow table in the NIC-accessible flow table set is used by the NIC. Specifically, as shown in FIG. 2c, the virtual-switch-accessible flow table set is generally stored in a storage device of a computing device; and the NIC-accessible flow table set may be stored in the storage device of the computing device, or may be stored in a storage device inside the NIC. If both the virtual-switch-accessible flow table set and the NIC-accessible flow table set are stored in the storage device of the computing device, the computing device separately spares a block of memory space in the storage device for the virtual-switch-accessible flow table set and the NIC-accessible flow table set. In accompanying drawings in the present disclosure, an example that the NIC-accessible flow table set is stored in the storage device of the computing device is described. Persons skilled in the art may directly deduce a case in which the NIC-accessible flow table set is stored inside the NIC.

In the present disclosure, an SR-IOV technology supporting a direct connection between a NIC and a VM is used as an example. In actual usage, another technology supporting the direct connection between the NIC and the VM may be used.

SDN Architecture Applied to Embodiments of the Present Disclosure

Figure 2A:
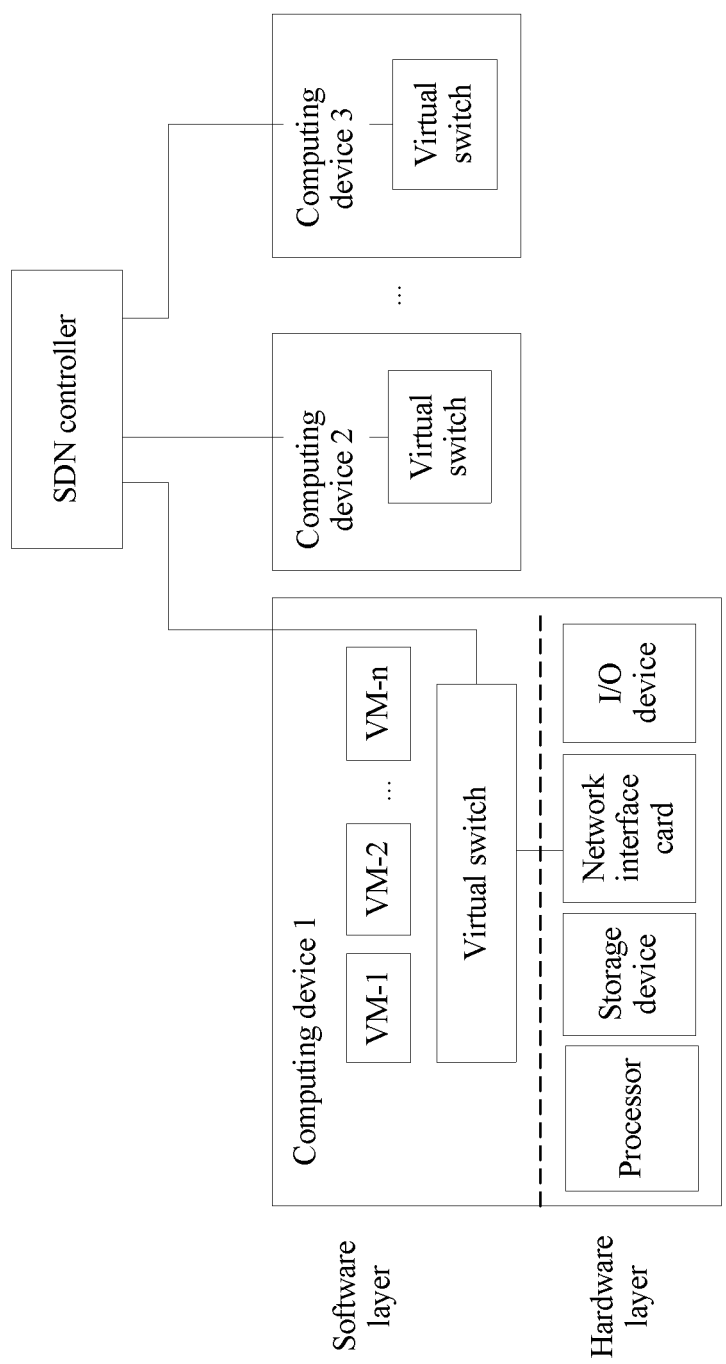
FIG. 2a is a schematic diagram of an SDN architecture according to an embodiment of the present disclosure.

FIG. 2a is a schematic diagram of an SDN architecture applied to an embodiment of the present disclosure. A centralized SDN controller is schematically used in FIG. 2a. Actually, SDN controllers may also be deployed on computing devices in a distributed manner.

A NIC, a processor, and a storage device are disposed at a hardware layer of each computing device. In the present disclosure, parts of each computing device other than the NIC are referred to as a host. The processor may be a central processing unit (CPU for short). The storage device includes a volatile memory, such as a random-access memory (RAM for short), and a non-volatile memory (non-volatile memory), such as a read-only memory (ROM for short), a Flash memory, an HDD, or an SSD. When each host runs, a hardware layer of the host supports running of a virtual switch and multiple VMs that are at a software layer. In each computing device, a host establishes a communications connection to a NIC. The host communicates with an external network by using the NIC. For example, first, the NIC obtains, from the external network, a data packet destined for a VM running on the host, and then sends the data packet to the VM running on the host; and a data packet sent to the external network by the VM running on the host is first sent to the NIC, and then sent to the external network by using the NIC.

Figure 2B:
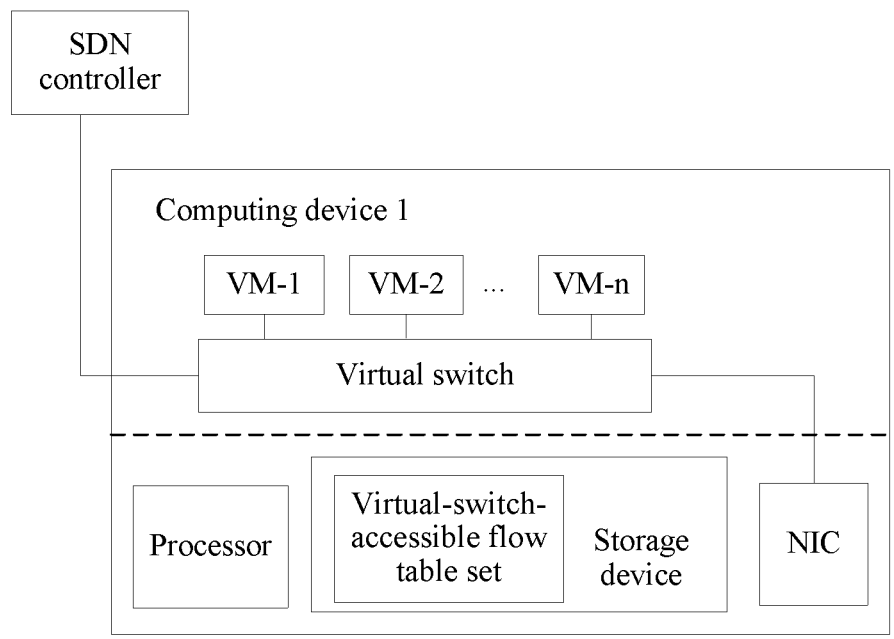
FIG. 2b is a schematic organizational structure diagram of a computing device in SDN in the prior art.
Figure 2C:
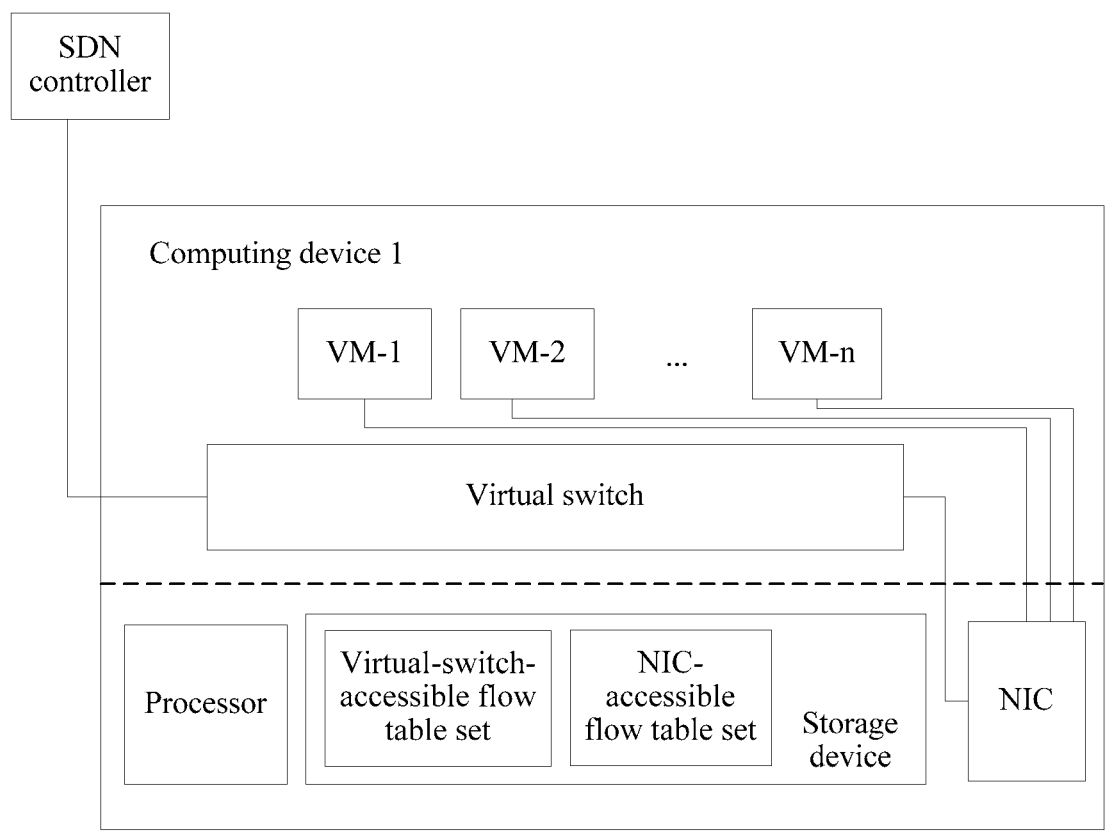
FIG. 2c is a schematic organizational structure diagram of a computing device according to an embodiment of the present disclosure.

In the following, a computing device 1 is used as an example to demonstrate a difference between a data packet processing process in the prior art and a data packet processing process provided in the present disclosure. As shown in FIG. 2b, in the prior art, after a virtual switch in the computing device 1 receives a data packet from a VM, the virtual switch performs matching between the data packet and a flow table in a virtual-switch-accessible flow table set, and sends, according to an indication in a matched flow table, the data packet to a NIC connected to the virtual switch. It can be learned from the foregoing data packet processing process that in the prior art, a main running pressure is centralized on the virtual switch in the data packet processing process. Running of the virtual switch relies on a resource at a hardware layer of the computing device. More processor and storage device resources occupied by the virtual switch indicate fewer resources available for running of the VM on the computing device. However, if an upper limit of resources that are at the hardware layer and that can be occupied by the virtual switch is specified, it is difficult to ensure performance of the virtual switch with an increase of data traffic.

As shown in FIG. 2c, in the data packet processing process provided in the present disclosure, after receiving a data packet from a VM, a NIC in the computing device 1 performs matching between the data packet and a flow table in a NIC-accessible flow table set, and sends, according to an indication in a matched flow table, the data packet to a destination VM connected to the NIC or an external network. The flow table in the NIC-accessible flow table set comes from a host. If the NIC cannot match the received data packet with the flow table, the NIC sends the data packet to a virtual switch. The virtual switch obtains, from an SDN controller, a flow table corresponding to the data packet, and sends the obtained flow table corresponding to the data packet to the NIC-accessible flow table set, so that the flow table can be used by the NIC in a subsequent data packet processing process.

It can be learned from the foregoing data packet processing process that in the data packet processing process provided in the present disclosure, some running pressures in the data packet processing process are transferred to the NIC. As a hardware device, the NIC not only has high processing efficiency, but also does not need to occupy another resource at the hardware layer during running.

It should be noted that all VMs on the computing device 1 in FIG. 2c are schematically connected to the NIC. Actually, it is possible that only some VMs are connected to the NIC, and the other VMs are connected to the virtual switch. For a specific configuration manner, not all VMs are limited to being connected to the NIC.

Figure 3:
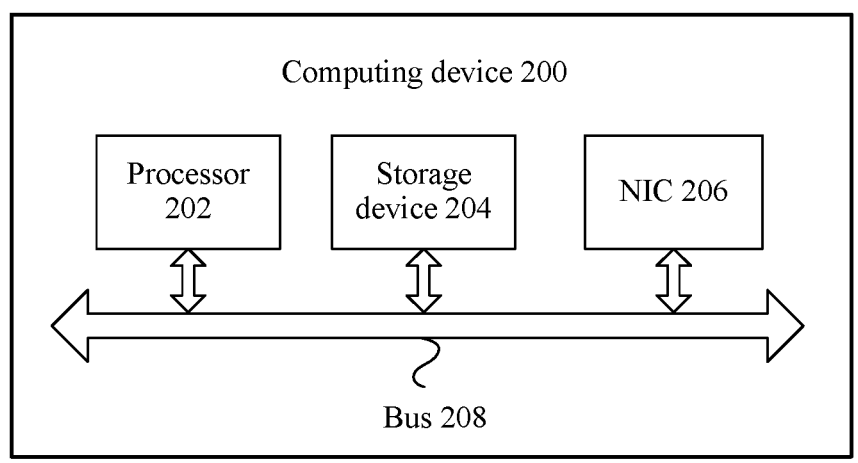
FIG. 3 is a schematic organizational structure diagram of another computing device according to an embodiment of the present disclosure.

The computing device in FIG. 2a and FIG. 2c may be implemented by using a computing device 200 shown in FIG. 3. A schematic organizational structure diagram of the computing device 200 is shown in FIG. 3. The computing device 200 includes a host and a NIC 206. The NIC 206 establishes, by using a bus 208 of the host, a communications connection to a processor 202 and a memory 204 of the host. The NIC 206, the processor 202, and the memory 204 may also communicate with each other by using other means such as wireless transmission. The computing device 200 communicates with an external network by using the NIC 206.

Figure 4A:
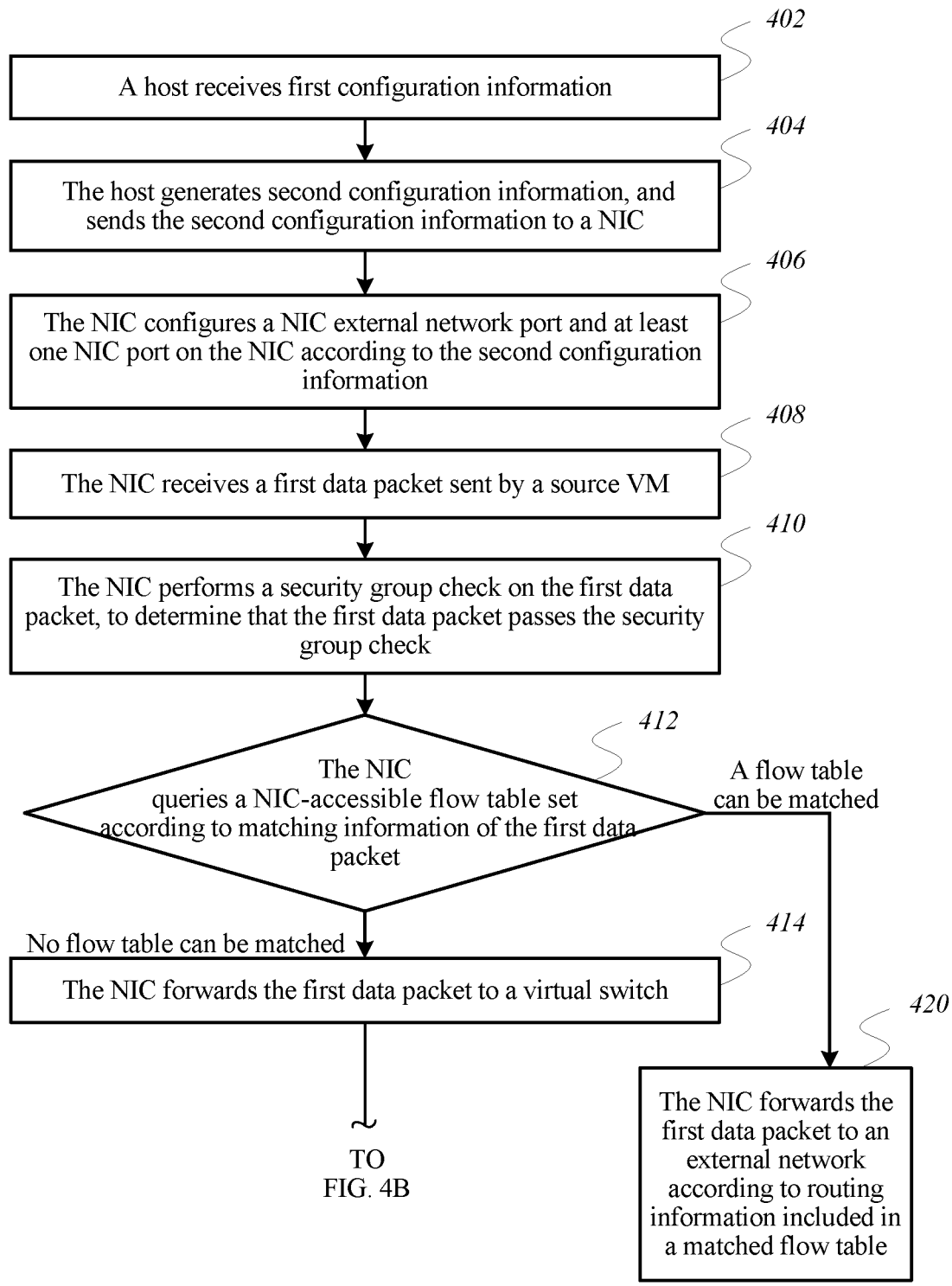

In an operating status, at least one VM and a virtual switch run on the host, and program code used to implement a host-side method in a data packet processing method provided in FIG. 4A and FIG. 4B is stored in the storage device 204 and executed by the processor 202. In the operating status, the NIC 206 performs a NIC-side method in the data packet processing method provided in FIG. 4A and FIG. 4B.

The present disclosure further provides a data packet processing method, and the computing device in the foregoing SDN architecture performs the method when running. A schematic flowchart of the method is shown in FIG. 4A and FIG. 4B.

Step 402: A host of the computing device receives first configuration information, where the first configuration information instructs to establish a virtual switch external network port and at least one virtual switch port on a virtual switch, and each virtual switch port corresponds to one VM running on the host.

Figure 5A:
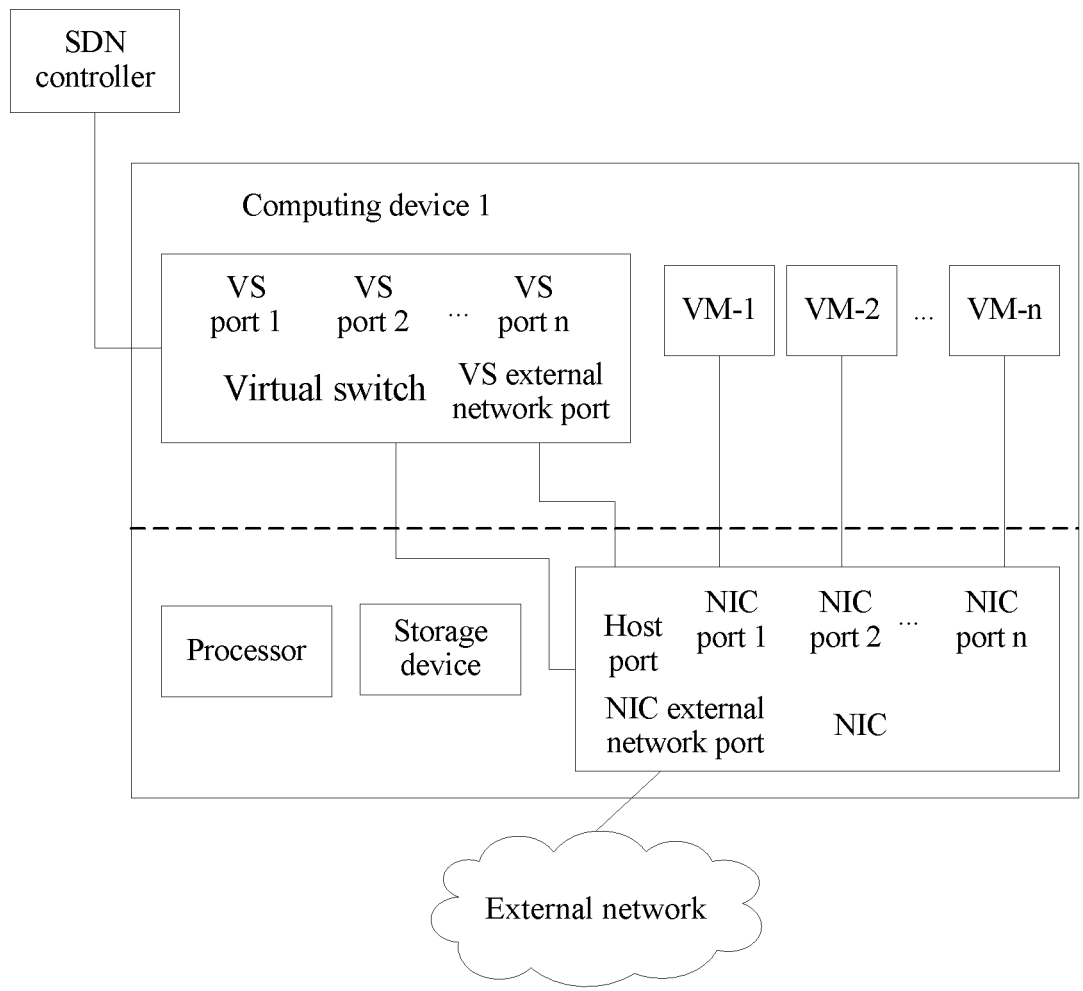
FIG. 5a is a schematic organizational structure diagram of another computing device according to an embodiment of the present disclosure.
Figure 5B:
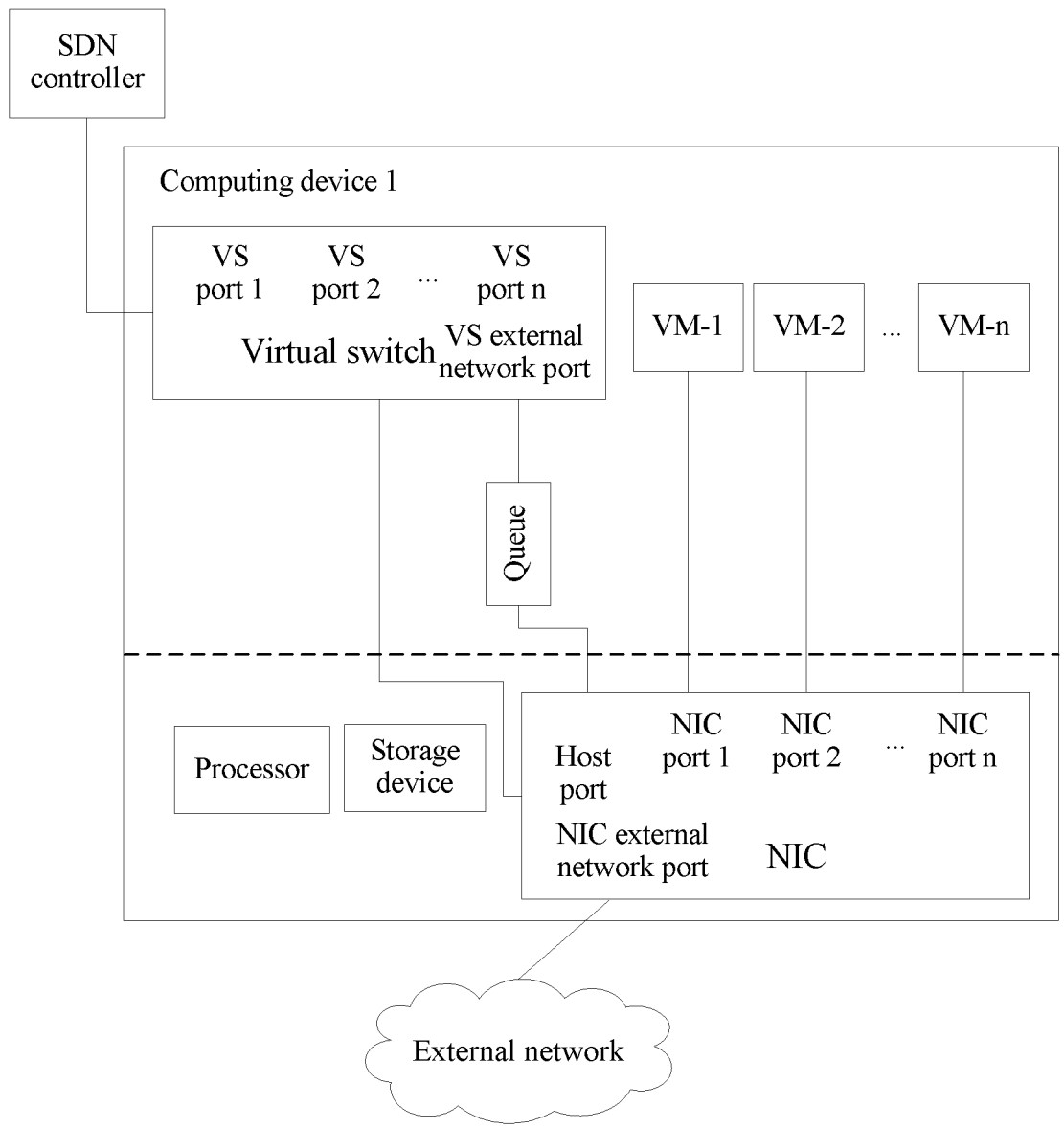
FIG. 5b is a schematic organizational structure diagram of another computing device according to an embodiment of the present disclosure.
Figure 5C:
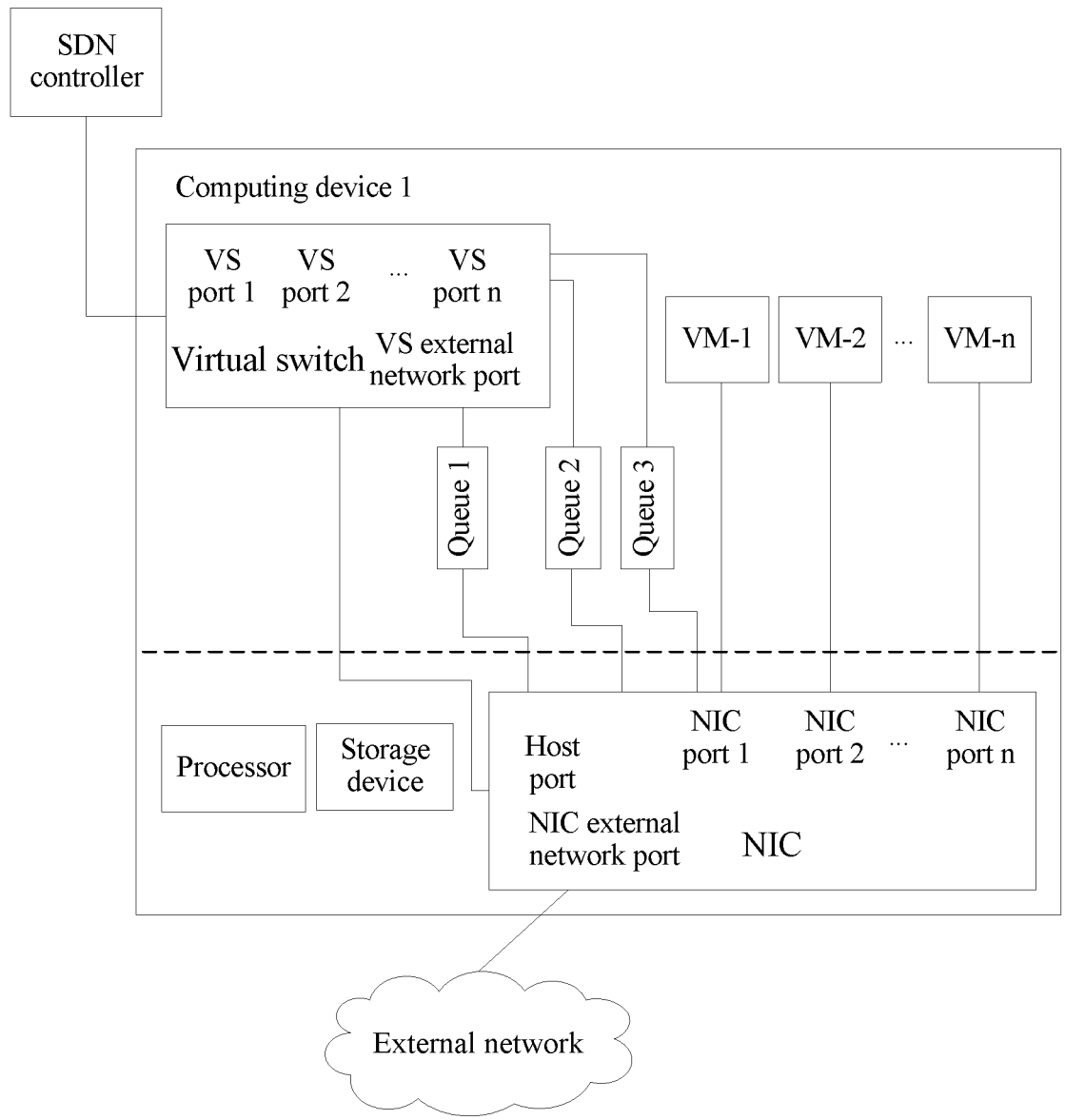
FIG. 5c is a schematic organizational structure diagram of another computing device according to an embodiment of the present disclosure.

As shown in FIG. 5a, FIG. 5b, or FIG. 5c, the VS external network port establishes a communications connection to a NIC. The virtual switch sends a packet whose destination is an external network to the NIC from the virtual switch external network port, and the NIC sends the packet to the external network.

Step 404: The host generates second configuration information, and sends the second configuration information to a NIC of the computing device.

Specifically, an interception module running on the host obtains the first configuration information, and sends the first configuration information to a NIC driver running on the host. The NIC driver generates the second configuration information according to the first configuration information, and sends the second configuration information to the NIC. The first configuration information and the second configuration information have a similar function, and the NIC driver converts the first configuration information into the second configuration information mainly for a purpose of conforming to a specification of communication between the NIC driver and the NIC.

Step 406: The NIC configures at least one NIC port on the NIC according to the second configuration information, where each NIC port connects, by using an SR-I/OV technology, to one VM running on the host.

Before step 406, a NIC external network port may be further configured on the NIC. Configuration of the NIC external network port may be completed before or after step 406, or the configuration of the NIC external network port may be completed in step 406 according to the second configuration information.

The NIC port may be specifically a port of a virtual function (VF for short) defined in the SR-I/OV technology. The NIC external network port is configured to communicate with the external network.

Step 402 to step 406 are optional steps, and step 402 to step 406 are a configuration process of the virtual switch and the NIC. Step 402 to step 406 do not need to be necessarily performed each time before step 408 and a step subsequent to step 408 are performed. As shown in FIG. 5a, FIG. 5b, or FIG. 5c, in this configuration process, the VM running on the host connects to the NIC by using the NIC port. Although a VS port in a one-to-one correspondence with a VM is established on the virtual switch, the VM running on the host does not connect to the virtual switch.

The present disclosure describes a scenario in which a destination of a data packet is the external network, and therefore a data packet received by the virtual switch corresponds to the VS external network port. Actually, the destination of the data packet received by the virtual switch may be a VM running on the computing device.

As shown in FIG. 5b, in the configuration process of the virtual switch and the NIC, or before or after the configuration process of the virtual switch and the NIC, at least one queue needs to be further configured for communication between the virtual switch and the NIC, so that the queue is used by the virtual switch to return a data packet received from the NIC to the NIC. There are two queue configuration manners. As shown in FIG. 5b, manner 1 is as follows: The virtual switch communicates with the NIC by using one queue, and the virtual switch sends, to the queue, all data packets that need to be sent to the NIC. As shown in FIG. 5c, manner 2 is as follows: The virtual switch communicates with the NIC by using multiple queues, at least one queue in the multiple queues is configured to send, to the NIC, a packet sent by the virtual switch by using the VS external network port, and remaining queues in the multiple queues are configured to send a packet corresponding to a VS port to the NIC.

The configuration process does not need to be perceived by an upper-layer management device. The computing device connects, to the NIC, a VM supposed to connect to the virtual switch, and the upper-layer management device does not need to modify configuration information, thereby improving compatibility in the configuration process and reducing an implementation difficulty.

Step 408: The NIC receives a first data packet sent by a source VM.

The NIC receives the first data packet by using the NIC port.

Step 410: The NIC performs a security group check on the first data packet, to determine that the first data packet passes the security group check.

It is determined whether the source VM belongs to a static security group. If it is determined that the source VM belongs to a static security group, it is determined whether the first data packet can match any rule of the static security group. If the first data packet can match at least one rule of the static security group, the first data packet passes a static security group check. If the source VM does not belong to any static security group, a static security group check does not need to be performed on the first data packet, and the first data packet is directly processed according to a first preset rule. For example, matching is performed between the first data packet and a flow table in a NIC-accessible flow table set. If the source VM belongs to a static security group, but the first data packet cannot match any rule of the static security group, the first data packet cannot pass the security group check. The first data packet is processed according to a second preset rule, for example, the first data packet is discarded.

The foregoing is a scenario in which a whitelist is configured in the static security group. Contrary to the scenario in which the whitelist is configured, in a scenario in which a blacklist is configured in the static security group, if the first data packet belongs to a static security group, but cannot match any rule of the static security group, the first data packet passes the security group check. If the source VM belongs to a static security group, and the first data packet can match at least one rule of the static security group, the first data packet cannot pass a static security group check.

In some embodiments, if a dynamic security group is configured, it is first determined whether the source VM belongs to the dynamic security group. If the source VM belongs to the dynamic security group, a connection track table is queried according to the first data packet, to confirm that the first data packet belongs to which connection, and determine a connection status of the first data packet and a processing action corresponding to the first data packet. If the processing action of the first data packet instructs to perform matching between the first data packet and a flow table in the NIC-accessible flow table set, the first data packet passes a dynamic security group check.

The static security group and the dynamic security group in the foregoing may be both configured. In this case, a data packet passing both the static security group check and the dynamic security group check passes the security group check.

Step 412: The NIC queries a NIC-accessible flow table set according to matching information of the first data packet. If no flow table in the NIC-accessible flow table set can be obtained by means of matching, perform step 414, step 416, and step 4181, or step 4182 to step 4184, or step 4185 and step 4186; or if a flow table in the NIC-accessible flow table set can be obtained by means of matching, perform step 420.

If the matching information of the first data packet cannot match any flow table in the NIC-accessible flow table set, the first data packet is the $1^{st}$ data packet of a data flow in which the first data packet is located, or the first data packet is not the $1^{st}$ data packet of the data flow, and a flow table corresponding to the data flow has been deleted from the NIC-accessible flow table set.

If the matching information of the first data packet can match a flow table in the NIC-accessible flow table set, it indicates that a flow table corresponding to the data flow in which the first data packet is located has been stored in the NIC-accessible flow table set.

Step 414: The NIC forwards the first data packet to the virtual switch by using a host port.

The host port may be a port of a physical function (PF for short) defined in the SR-I/OV technology.

Step 416: After receiving the first data packet, the virtual switch obtains a flow table corresponding to the data flow, and adds the flow table corresponding to the data flow to the NIC-accessible flow table set.

After obtaining the first data packet, the virtual switch sends the first data packet to an SDN controller, and a virtual-switch-accessible flow table set receives a flow table that is generated by the SDN controller according to the first data packet and that corresponds to the data flow. Alternatively, the virtual-switch-accessible flow table set may store information, such as a slow table, required for generating the flow table corresponding to the data flow. The virtual switch merely needs to generate the flow table corresponding to the data flow according to the information with no need to send the first data packet to the SDN controller.

The virtual switch saves the flow table corresponding to the data flow into the virtual-switch-accessible flow table set and the NIC-accessible flow table set. Alternatively, a monitoring module running on the host monitors the virtual switch to obtain the flow table corresponding to the data flow. The monitoring module saves the flow table corresponding to the data flow into the NIC-accessible flow table set.

The flow table corresponding to the data flow is generated by the SDN controller, and the SDN controller does not need to learn that the VM running on the host is actually connected to the NIC. Therefore, data packet routing information of the data flow may specifically include a VS external network port identifier. In addition, the VS external network port corresponds to the NIC external network port, and therefore the data packet routing information of the data flow indicates the NIC external network port.

After step 416, there are three optional solutions for sending the first data packet to a destination. The three optional solutions are respectively: step 4181, step 4182 to step 4184, and step 4185 and step 4186. Actually, any one of the three solutions may be executed after step 416.

Step 4181: The NIC queries the NIC-accessible flow table set according to the matching information of the first data packet, to obtain the flow table corresponding to the data flow, and forwards the first data packet to the external network according to data packet routing information of the data flow.

In this case, the NIC needs to store a correspondence between a VS external network port identifier and a NIC external network port identifier. After obtaining the VS external network port identifier included in the data packet routing information of the data flow, the NIC converts the VS port identifier into a NIC external network port identifier, and sends the first data packet from the NIC external network port.

After saving the flow table corresponding to the data flow into the NIC-accessible flow table set in step 416, the virtual switch or the monitoring module sends a notification message to the NIC. The notification message is used to notify the NIC that the flow table corresponding to the data flow has been stored in the NIC-accessible flow table set. After receiving the notification message, the NIC can obtain, by means of matching according to the matching information of the first data packet, the flow table corresponding to the data flow in the NIC-accessible flow table set.

Alternatively, after step 414, the NIC periodically attempts to match a flow table in the NIC-accessible flow table set according to the matching information of the first data packet. After performing of step 416 is completed, during next matching, the NIC can obtain, by means of matching according to the matching information of the first data packet, the flow table corresponding to the data flow in the NIC-accessible flow table set.

In the optional step 4181, the virtual switch does not need to perform matching between the first data packet and the flow table corresponding to the data flow, and an operating load of the virtual switch is reduced.

Step 4182: The virtual switch performs matching between the first data packet and the flow table that corresponds to the data flow and that is in the virtual-switch-accessible flow table set, to obtain data packet routing information of the data flow.

Step 4183: The virtual switch generates a returned first data packet according to the data packet routing information of the data flow, and sends the returned first data packet to the NIC, where the returned first data packet includes a port identifier corresponding to the external network, and the port identifier is a virtual switch external network port identifier or a NIC external network port identifier.

Step 4184: The NIC receives the returned first data packet, and forwards the second data packet to the external network according to the port identifier.

In step 416, the data packet routing information of the data flow may specifically include the VS external network port identifier.

In some embodiments, in step 4183, as shown in FIG. 5b, the virtual switch adds the data packet routing information of the data flow to the returned first data packet, and sends the returned first data packet to the NIC by using a queue. In this case, the NIC needs to store the correspondence between a VS external network port identifier and a NIC external network port identifier. After receiving the returned first data packet, the NIC converts the VS external network port identifier into a NIC external network port identifier, and sends the first data packet to the external network by using the NIC external network port. In this implementation manner, the virtual switch has a lower load, and operating efficiency of the host is improved.

In some embodiments, in step 4183, as shown in FIG. 5b, after obtaining the data packet routing information of the data flow, the virtual switch converts the VS external network port identifier included in the data packet routing information of the data flow into a NIC external network port, adds the NIC external network port to the returned first data packet, and sends the returned first data packet to the NIC by using a queue. In this case, the virtual switch needs to store the correspondence between a VS external network port identifier and a NIC external network port identifier. After receiving the returned first data packet, the NIC sends the first data packet to the external network by using the NIC external network port. In this implementation manner, the NIC does not need to convert the port identifier, so that a data packet can be processed more efficiently.

Step 4185: The virtual switch sends the first data packet to a queue corresponding to the external network.

Step 4186: The NIC receives the first data packet from the queue corresponding to the external network, and the NIC forwards, according to queue information of the queue corresponding to the external network, the first data packet to the external network from the NIC external network port.

As shown in FIG. 5c, the virtual switch communicates with the NIC by using multiple queues, and a queue 1 is used for communication between the VS external network port and the NIC. The virtual switch performs matching between the first data packet and the flow table corresponding to the data flow in the virtual-switch-accessible flow table set. After obtaining the data packet routing information of the data flow, such as the VS external network port identifier, the virtual switch sends the first data packet to the queue 1.

The NIC obtains the first data packet from the queue 1. The NIC driver running on the host sends queue information to the NIC, and the queue information is used to notify the NIC that the first data packet comes from the queue 1. The queue 1 corresponds to the NIC external network port. Therefore, the NIC sends the first data packet to the external network by using the NIC external network port. Compared with the foregoing two optional solutions, in this implementation manner, neither the virtual switch nor the NIC needs to convert the data packet routing information of the data flow into the NIC external network port identifier, and data packet forwarding efficiency is improved.

After it is confirmed that the first data packet needs to be sent from the NIC external network port in the three optional solutions, in some embodiments, the NIC further adds a first overlay header to the first data packet to generate a first overlay data packet. The first overlay header includes a Virtual Extensible Local Area Network VXLAN header, a Network Virtualization using Generic Routing Encapsulation NVGRE header, or a Stateless Transport Tunneling STT header.

It should be noted that, actually whether to add an overlay header to the first data packet is determined according to network setting. The overlay technology is not always used for all data packets sent to the external network.

Step 420: The NIC forwards the first data packet to the external network according to routing information included in a matched flow table.

The NIC obtains, by means of matching in the NIC-accessible flow table set according to the matching information of the first data packet, a flow table corresponding to a data flow in which the first data packet is located, and forwards the first data packet to the external network according to data packet routing information of the data flow included in the flow table.

In step 412, the NIC can match the first data packet with a flow table in the NIC-accessible flow table set. Therefore, the first data packet is not the 1$^{st}$ data packet of the data flow in which the first data packet is located.

In step 420, after the flow table corresponding to the data flow in which the first data packet is located is obtained, in some embodiments, a first overlay header may be added to the first data packet according to network setting of the data flow in which the first data packet is located, so as to generate a first overlay data packet. The first overlay header includes a VXLAN header, an NVGRE header, or an STT header. Then the first overlay data packet is sent to the external network.

After step 4181, step 4184, step 4186, or step 420, when the NIC continues to receive a subsequent data packet of the data flow, such as a second data packet, if the flow table corresponding to the data flow is still stored in the NIC-accessible flow table set, the NIC forwards a second overlay data packet to the external network according to the data packet routing information of the data flow. The second overlay data packet includes the second data packet and a second overlay header corresponding to the second data packet. However, actually, the flow table in the NIC-accessible flow table set may be updated with time. Although the flow table corresponding to the data flow is added to the NIC-accessible flow table set in step 416, when the NIC cannot obtain, by means of matching, any flow table in the NIC-accessible flow table set according to matching information of the subsequent data packet, step 414, step 416, and step 4181, or step 4182 to step 4184, or step 4185 and step 4186 are performed for the subsequent data packet.

In the data packet processing method, a NIC executes a function of performing matching between a data packet and a flow table, so that an operating load of a virtual switch is reduced, a VM can be better served by using a resource at a hardware layer of a host, and operating efficiency of a computing device is improved.

Figure 5D:
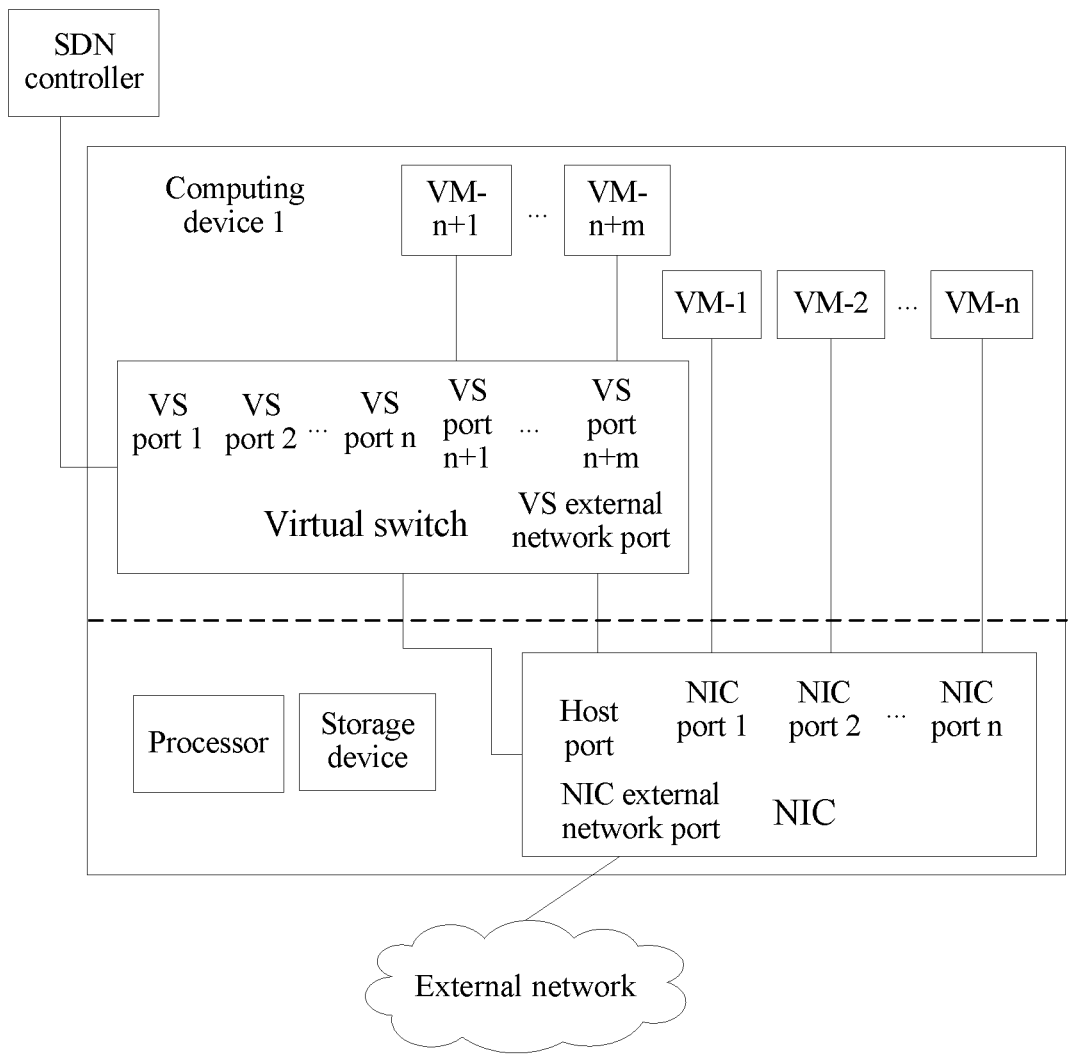
FIG. 5d is a schematic organizational structure diagram of another computing device according to an embodiment of the present disclosure.

Referring to FIG. 5d, FIG. 5d is a schematic structural diagram of another computing device according to the present disclosure. Different from that in FIG. 5a, FIG. 5b, or FIG. 5c, a VM–1 to a VM–n on the computing device are connected to a NIC, and a VM–n+1 to a VM–n+m are connected to a virtual switch. Configuration of the VM–n+1 to the VM–n+m may be completed before the configuration process of the virtual switch and the NIC in FIG. 4A and FIG. 4B is performed; or in the configuration process of the virtual switch and the NIC in FIG. 4A and FIG. 4B, the VM–n+1 to the VM–n+m are selectively connected to the virtual switch, and the VM–1 to the VM–n are selectively connected to the NIC. Specifically, according to a load status of a host or according to information carried in configuration information received by the host, it may be configured as follows: Some VMs are connected to the NIC, and the rest VMs are connected to the virtual switch.

In a scenario of FIG. 5d, a data packet received by the NIC may come from the VM–1 to the VM–n or the VM–n+1 to the VM–n+m. If the data packet comes from the VM–1 to the VM–n, the data packet processing method in FIG. 4A and FIG. 4B is performed on the data packet; or if the data packet comes from the VM–n+1 to the VM–n+m, matching between the data packet and a flow table is completed on the virtual switch, and the NIC processes the data packet according to a matching result. In this case, a flow table corresponding to a data flow in which data packets sent from the VM–n+1 to the VM–n+m are located is not stored in a NIC-accessible flow table set.

Figure 6A:
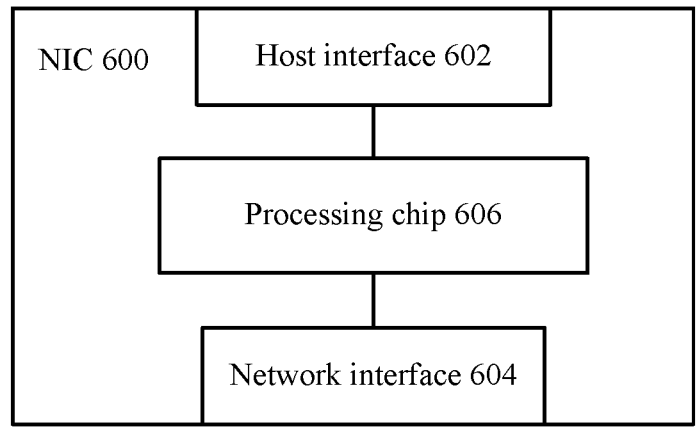
FIG. 6a is a schematic organizational structure diagram of a NIC according to an embodiment of the present disclosure.

The present disclosure further provides a NIC 600, and the NIC 600 may be the NIC provided in any one of the foregoing accompanying drawings. A schematic organizational structure diagram of the NIC 600 is shown in FIG. 6a, and the NIC 600 includes a host interface 602, a network interface 604, and a processing chip 606. The network interface 604 is configured to communicate with an external network, and the network interface 604 establishes a communications connection to the processing chip 606. The host interface 602 is configured to communicate with a virtual switch, a VM, a NIC driver, and the like that are running on a host connected to the NIC 600. The host interface 602 establishes a communications connection to the processing chip 606. In the foregoing data packet processing method, the NIC port, the NIC external network port, and the host port established on the NIC are virtual ports, and actually, the host port and the NIC port communicate with the host by using the host interface 602, and the NIC external network port communicates with the external network by using the network interface 604. Referring to FIG. 3, actually, the host interface 602 may be an interface for connecting the NIC 600 and a bus of a computing device.

The host interface 602 is configured to obtain configuration information from the host connected to the NIC, and send the configuration information to the processing chip 606.

The processing chip 606 is configured to connect, according to the configuration information, the NIC 600 and the VM running on the host, and establish a NIC external network port.

Specifically, reference may be made to the foregoing step 406.

The foregoing describes functions of all units of the NIC 600 in a configuration process of the NIC 600. The NIC 600 may further be configured to process a data packet, and reference may be made to step 408 and a step after step 408 in the foregoing data packet processing method.

The host interface 602 is further configured to receive a first data packet sent by a source VM, and reference may be made to step 408.

The host interface 602 sends the received first data packet to the processing chip 606.

After receiving the first data packet, the processing chip 606 processes the first data packet with reference to the foregoing step 410 and step 412.

The processing chip 606 is further configured to perform step 412, to determine that step 414 and a subsequent step are performed when the first data packet cannot match any flow table in a NIC-accessible flow table set.

After step 414, the processing chip 606 executes any one of three optional solutions. The three optional solutions are respectively corresponding to the foregoing step 4181, a part executed by a NIC side in the foregoing step 4182 to step 4184, and a part executed by the NIC side in the foregoing step 4185 and step 4186.

An optional solution 1 corresponds to the foregoing step 4181. The processing chip 606 queries the NIC-accessible flow table set according to matching information of the first data packet, to obtain a flow table corresponding to a data flow in which the first data packet is located, that is, to obtain a VS external network port identifier included in data packet routing information of the data flow, and converts the VS external network port identifier into a NIC external network port identifier.

An optional solution 2 corresponds to the part executed by the NIC side in the foregoing step 4182 to step 4184. The processing chip 606 receives a returned first data packet, and the processing chip 606 obtains the NIC external network port identifier according to a port identifier carried in the returned first data packet. If the port identifier is a virtual switch external network port identifier, the processing chip 606 converts the virtual switch port identifier into a NIC external network port identifier. The port identifier may also be a NIC external network port identifier.

An optional solution 3 corresponds to the part executed by the NIC side in the foregoing step 4185 and step 4186. The processing chip 606 receives the first data packet from a queue corresponding to a VS external network port. Because a correspondence between the queue and the NIC external network port is preconfigured in the processing chip 606, the processing chip 606 may obtain the NIC external network port identifier.

The processing chip 606 performs step 412. When determining that the first data packet can match a flow table in the NIC-accessible flow table set, the processing chip 606 obtains data packet routing information of the data flow included in the matched flow table. The data packet routing information of the data flow may include a VS external network port identifier. The processing chip 606 converts the VS external network port identifier into a NIC external network port identifier, and sends the first data packet from a NIC external network port.

After the flow table corresponding to the data flow in which the first data packet is located is obtained, in some embodiments, the processing chip 606 may add a first overlay header to the first data packet according to network setting of the data flow, so as to generate a first overlay data packet, and then send the first overlay data packet to the external network.

The foregoing provided NIC implements a flow table matching function. A data packet in a NIC-accessible flow table set does not need to be sent to a virtual switch for processing, thereby reducing a load of a host, and improving operating efficiency of a host connected to the NIC.

The processing chip 606 may be implemented by using an application-specific integrated circuit (ASIC for short), or implemented by using a programmable logic device (PLD for short). The foregoing PLD may be a complex programmable logical device (CPLD for short), a field programmable gate array (FPGA for short), a generic array logic (GAL for short), or any combination thereof.

Figure 6B:
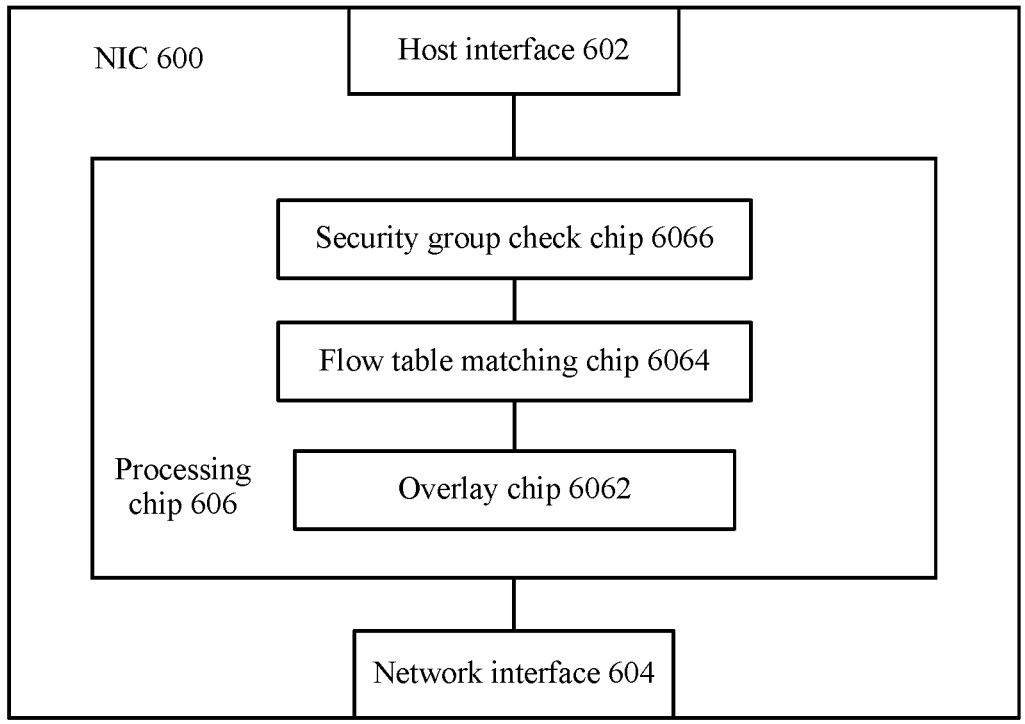
FIG. 6b is a schematic organizational structure diagram of another NIC according to an embodiment of the present disclosure.

Specifically, as shown in FIG. 6b, the processing chip 606 may include an overlay chip 6062, a flow table matching chip 6064, and a security group check chip 6066. The overlay chip 6062 is configured to encapsulate an overlay header. The security group check chip 6066 is configured to determine whether a data packet passes a security group check, and send a data packet passing the security group check to the flow table matching chip 6064. The flow table matching chip 6064 is configured to perform matching between a data packet and a flow table stored in the NIC-accessible flow table set. The overlay chip 6062 and the security group check chip 6066 are optional components.

Figure 6C:
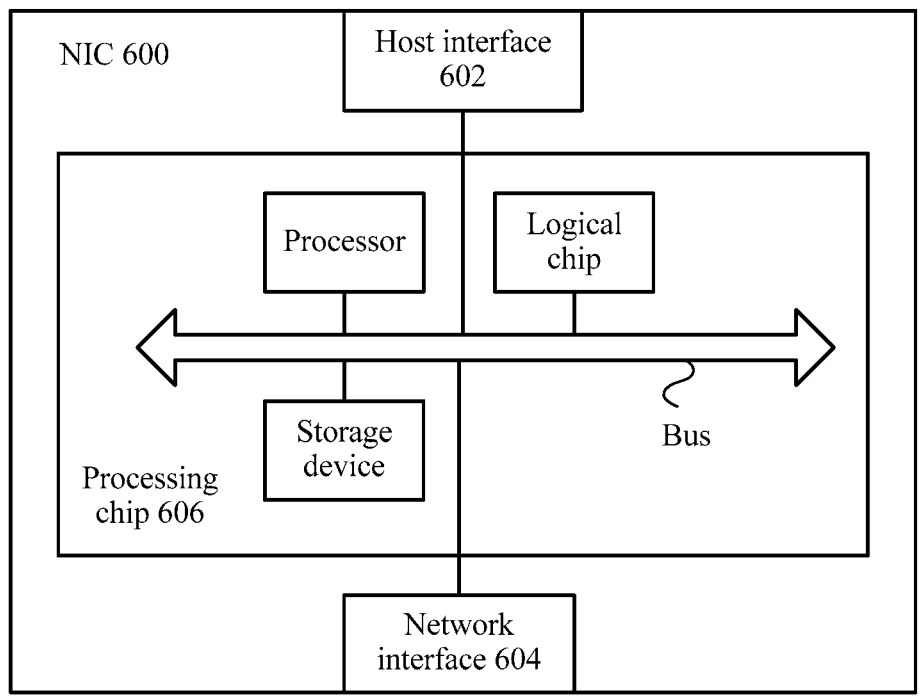
FIG. 6c is a schematic organizational structure diagram of another NIC according to an embodiment of the present disclosure.

The processing chip 606 may further be implemented by using a processor, a storage device, and a logical chip. The logical chip may be implemented by using a PLD or an ASIC. When the processing chip 606 runs, the processor and the logical chip separately execute some functions that may be allocated in multiple manners. For example, as shown in FIG. 6c, when the processor in the processing chip 606 runs, code in a memory is read, so as to read information required for performing a security group check, and the information required for performing a security group check is sent to the logical chip, so that the logical chip performs a security group check on the data packet. The processor is further configured to read a flow table in the NIC-accessible flow table set, and send the flow table in the NIC-accessible flow table set to the logical chip, so that the logical chip performs matching between the data packet and the flow table. The processor is further configured to obtain information required for encapsulating an overlay header, and send the information required for encapsulating an overlay header to the logical chip, so that the logical chip encapsulates an overlay header.

In the processing chip 606 of the NIC 600 shown in FIG. 6c, the logical chip may also include an overlay sub-chip, a flow table matching sub-chip, and a security group check sub-chip. The overlay sub-chip and the security group check sub-chip are optional components. The processor in the processing chip 606 of the NIC 600 shown in FIG. 6c is configured to obtain information required for flow table matching, information required for performing a security group check, or information required for encapsulating an overlay header, and send the information to the logical chip. The security group check sub-chip completes the security group check on the data packet according to the information required for performing a security group check; the flow table matching sub-chip completes flow table matching of the data packet according to the information required for flow table matching; and the overlay sub-chip is configured to encapsulate an overlay header according to the information sent by the processor.

The present disclosure further provides a data packet processing method, and the NIC in any one of the foregoing accompanying drawings executes the method when running. For the method, reference may be specifically made to a part executed by a NIC side in the data packet processing method corresponding to FIG. 4A and FIG. 4B.

The present disclosure further provides a configuration method, and the host in any one of the foregoing accompanying drawings executes the method when running. For the method, reference may be specifically made to step 402 and step 404 in the data packet processing method corresponding to FIG. 4A and FIG. 4B.

The present disclosure further provides a data packet processing method, and the host in any one of the foregoing accompanying drawings executes the method when running. For the method, reference may be specifically made to a method executed by a host side after step 408 in the data packet processing method corresponding to FIG. 4A and FIG. 4B. The method specifically includes step 416 and a part of sending a notification message to the NIC after a flow table corresponding to a data flow is saved into a NIC-accessible flow table set in step 4181, or step 4182 and step 4183, or step 4185.

In the foregoing embodiments, the description of each embodiment has respective focuses. For a part that is not described in detail in an embodiment, reference may be made to related descriptions in other embodiments.

The method described with reference to disclosed content in the present disclosure may be implemented by executing a software instruction by a processor.

The software instruction may include a corresponding software module. The software module may be stored in a RAM, a Flash memory, a ROM, an erasable programmable read only memory (EPROM for short), an electrically erasable programmable read-only memory (EEPROM for short), a hard disk, an optical disc, or a storage medium in any other form well-known in the art.

Persons skilled in the art should be aware that in one or more of the foregoing examples, functions described in the present disclosure may be implemented by using hardware or software. When the functions are implemented by software, these functions may be stored in a computer-readable medium or transmitted as one or more instructions or code in the computer-readable medium. The storage medium may be any available medium accessible to a general or dedicated computer.

The objectives, technical solutions, and benefits of the present disclosure are further described in detail in the foregoing specific embodiments. It should be understood that the foregoing descriptions are merely specific embodiments, and are not intended to limit the protection scope of the present disclosure. Any modification or improvement made based on the technical solutions of the present disclosure shall fall within the protection scope of the present disclosure.

What is claimed is:

1. A data packet processing method, wherein the method is applied to a computing device comprising a network interface card (NIC) and a host, the method comprising:
  receiving, by the NIC, a first data packet of a data flow sent by a virtual machine (VM) running on the host;
  matching, by the NIC, a flow table set according to matching information of the first data packet; and
  forwarding, by the NIC, the first data packet to a virtual switch running on the host when the matching is failed;
  receiving, by the virtual switch, the first data packet;
  obtaining, by the virtual switch the flow table corresponding to the data flow from a software-defined networking (SDN) controller; and
  updating the flow table set by saving, by the virtual switch, the flow table corresponding to the data flow into the flow table set;
  re-matching, by the NIC, the flow table set according to matching information of the first data packet; and,
  forwarding, by the NIC, the first data packet according to the matched flow table.

2. The data packet processing method according to claim 1, wherein at least one virtual switch port is configured on the virtual switch, one of the at least one virtual switch port corresponding to one of the at least one VM running on the host, and the method further comprises:
  receiving, by the NIC, configuration information of the virtual switch port; and
  configuring, by the NIC, a NIC port on the NIC according to the configuration information, wherein the NIC port connects to external network.

3. The data packet processing method according to claim 2, wherein the flow table corresponding to the data flow comprises data packet routing information of the data flow.

4. The data packet processing method according to claim 1, wherein before the forwarding, by the NIC, the first data packet according to the matched flow table, the method further comprises:
  adding, by the NIC, an overlay header to the first data packet to generate an overlay data packet, wherein the overlay header comprises a Virtual Extensible Local Area Network (VXLAN) header, a Network Virtualization using Generic Routing Encapsulation (NVGRE) header, or a Stateless Transport Tunneling (STT) header.

5. The data packet processing method according to claim 1, wherein the method further comprises:
  performing, by the NIC, a security group check on the first data packet; and
  determining, by the NIC, whether the first data packet passes the security group check.

6. A network interface card (NIC) comprising a host interface, a network interface, and a processing chip, the network interface is configured to communicate with an external network and communicate to the processing chip, the host interface is configured to communicate with a host and the processing chip;
  the host interface is configured to receive a first data packet of a data flow sent by a virtual machine (VM) running on the host; and
  the processing chip is configured to:
  receive the first data packet;
  match a flow table set according to matching information of the first data packet; and
  forward through the host interface the first data packet to a virtual switch running on the host when the matching is faded;
  re-match the flow table set according to matching information of the first data packet after the flow table set is updated by the virtual switch, wherein the updated flow table set includes a flow table corresponding to the data flow obtained from a software-defined networking (SDN) controller; and,
  forward the first data packet according to the matched flow table.

7. The NIC according to claim 6, wherein at least one virtual switch port is configured on the virtual switch, one of the at least one virtual switch port corresponding to one of the at least one VM running on the host; and
  the processing chip is further configured to receive configuration information of the virtual switch port, and configure a NIC port on the NIC according to the configuration information, wherein the NIC port connects to external network.

8. The NIC according to claim 6, wherein; wherein the processing chip is further configured to: add an overlay header to the first data packet to generate an overlay data packet, wherein the overlay header comprises a Virtual Extensible Local Area Network (VXLAN) header, a Network Virtualization using Generic Routing Encapsulation (NVGRE) header, or a Stateless Transport Tunneling (STT) header.

9. The NIC according to claim 6, wherein the processing chip is further configured to: perform a security group check on the first data packet, and determine whether the first data packet passes the security group check.

10. A data packet processing method, wherein the method is applied to a computing device comprising a network interface card (NIC) and a host, the method comprising:
  receiving, by the NIC, a first data packet of a data flow sent by a virtual machine (VM) running on the host;
  matching, by the NIC, a flow table set according to matching information of the first data packet;
  forwarding, by the NIC, the first data packet to a virtual switch running on the host when the matching is failed;
  receiving, by the virtual switch, the first data packet;
  obtaining, by the virtual switch, a flow table corresponding to the data flow from a software-defined networking (SDN) controller;
  updating the flow table set by saving, by the virtual switch, the flow table corresponding to the data flow into the flow table set;

determining, by the virtual switch, data packet routing information of the data flow according to the flow table;
receiving, by the NIC, the data packet routing information; and
forwarding, by the NIC, the first data packet according to the data packet routing information.

11. The data packet processing method according to claim 10, wherein at least one virtual switch port is configured on the virtual switch, one of the at least one virtual switch port corresponding to one of the at least one VM running on the host; and the method further comprises:
receiving, by the NIC, configuration information; and
configuring, by the NIC, a NIC port on the NIC according to the configuration information, wherein the NIC port connects to external network.

12. The data packet processing method according to claim 11, wherein the data packet routing information of the data flow comprises a port identifier, wherein the port identifier comprises a virtual switch port identifier or a NIC port identifier;
wherein the NIC forwards the first data packet to the external network through the NIC port according to the port identifier.

13. The data packet processing method according to claim 11, wherein the data packet routing information of the data flow comprises a queue corresponding to the external network;
wherein the virtual switch stores the first data packet into the queue; wherein the NIC obtains the first data packet from the queue, and forward the first data packet to the external network.

14. The data packet processing method according to claim 10, wherein the first data packet of the data flow is an overlay-type data packet, wherein the overlay-type data packet comprises an overlay header and the first data packet, the overlay header comprises a virtual extensible local area network (VXLAN) header, a network virtualization using generic routing encapsulation (NVGRE) header, or a stateless transport tunneling (STT) header; wherein the method further comprises:
stripping, by the NIC, the overlay header to obtain the first data packet.

15. The data packet processing method according to claim 10, wherein the method further comprises:
performing, by the NIC, a security group check on the first data packet; and
determining, by the NIC, whether the first data packet passes the security group check.

16. A network interface card (NIC) comprising:
a host interface;
a network interface; and
a processing chip, wherein the network interface is configured to communicate with the processing chip, the host interface is configured to communicate with a host, wherein at least one virtual machine (VM) runs on the host, and the host interface is configured to communicate with the processing chip,
wherein the processing chip is configured to: receive a first data packet of a data flow; match a flow table set according to matching information of the first data packet; forward the first data packet to a virtual switch running on the host when the matching is failed; receive data packet routing information corresponding to the data flow determined by the virtual switch, wherein the virtual switch obtains a flow table corresponding to the data flow from a software-defined networking (SDN) controller and updates the updated flow table set by storing the flow table corresponding to the data flow; and forward the first data packet according to the data packet routing information.

17. The NIC according to claim 16, wherein at least one virtual switch port is configured on the virtual switch, one of the at least one virtual switch port corresponding to one of the at least one VM running on the host, and the processing chip is further configured to: receive configuration information; and configure a NIC port on the NIC according to the configuration information, wherein the NIC port connects to external network.

18. The NIC according to claim 17, wherein the data packet routing information of the data flow comprises a port identifier, wherein the port identifier comprises a virtual switch port identifier or a NIC port identifier;
wherein the NIC forwards the first data packet to the external network through the NIC port according to the port identifier.

19. The NIC according to claim 17, wherein the data packet routing information of the data flow comprises a queue corresponding to the external network;
wherein the virtual switch stores the first data packet into the queue; wherein the NIC obtains the first data packet from the queue, and forward the first data packet to external network through the NIC port.

20. The NIC according to claim 16, wherein the first data packet of the data flow is an overlay-type data packet, wherein the overlay-type data packet comprises an overlay header and the first data packet, the overlay header comprises a virtual extensible local area network (VXLAN) header, a network virtualization using generic routing encapsulation (NVGRE) header, or a stateless transport tunneling (STT) header; wherein the processing chip is further configured to: strip the overlay header to obtain the first data packet.

21. The NIC according to claim 16, wherein the processing chip is further configured to: perform a security group check on the first data packet; and determine whether the first data packet passes the security group check.

* * * * *

UNITED STATES PATENT AND TRADEMARK OFFICE
CERTIFICATE OF CORRECTION

PATENT NO. : 10,623,310 B2  
APPLICATION NO. : 15/927102  
DATED : April 14, 2020  
INVENTOR(S) : Tianyi Wu, Zhongjun Zhang and Tao Gan Page 1 of 1

It is certified that error appears in the above-identified patent and that said Letters Patent is hereby corrected as shown below:

In the Claims

Column 26, Line 22, Claim 6: please delete "faded" and insert --failed--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*